United States Patent
Rekaya et al.

(10) Patent No.: US 11,641,251 B2
(45) Date of Patent: May 2, 2023

(54) DEVICES AND METHODS FOR ADAPTIVE DECODING AND CORE SCRAMBLING IN MULTI-CORE FIBER TRANSMISSION SYSTEMS

(71) Applicant: INSTITUT MINES-TELECOM, Palaiseau (FR)

(72) Inventors: Ghaya Rekaya, Antony (FR); Akram Abouseif, Paris (FR); Yves Jaouen, Paris (FR)

(73) Assignee: INSTITUT MINES-TELECOM, Palaiseau (FR)

( * ) Notice: Subject to any disclaimer, the term of this patent is extended or adjusted under 35 U.S.C. 154(b) by 0 days.

(21) Appl. No.: 17/274,421

(22) PCT Filed: Sep. 4, 2019

(86) PCT No.: PCT/EP2019/073610
§ 371 (c)(1),
(2) Date: Mar. 8, 2021

(87) PCT Pub. No.: WO2020/057981
PCT Pub. Date: Mar. 26, 2020

(65) Prior Publication Data
US 2022/0052781 A1 Feb. 17, 2022

(30) Foreign Application Priority Data

Sep. 18, 2018 (EP) .................................... 18306214

(51) Int. Cl.
*H04B 10/079* (2013.01)
*H04L 1/00* (2006.01)
*H04L 1/20* (2006.01)

(52) U.S. Cl.
CPC ....... *H04L 1/0036* (2013.01); *H04B 10/0795* (2013.01); *H04L 1/20* (2013.01)

(58) Field of Classification Search
CPC ..... H04L 1/0036; H04L 1/20; H04B 10/0795; H04B 10/2507; H04B 10/2581;
(Continued)

(56) References Cited

U.S. PATENT DOCUMENTS 9,948,364 B2 *  4/2018  Mejri .................... H04L 1/06
2017/0195052 A1 *  7/2017  Awwad .................. H04J 14/04

FOREIGN PATENT DOCUMENTS

EP       2 751 942 A1    7/2014
WO    2013/033703 A1    3/2013

OTHER PUBLICATIONS

Morioka, "New generation optical infrastructure technologies: "EXAT initiative" towards 2020 and beyond", OptoElectronic Communication Conference, paper FT4, 2009.
(Continued)

*Primary Examiner* — Hibret A Woldekidan
(74) *Attorney, Agent, or Firm* — BakerHostetler

(57) ABSTRACT

A decoder for determining an estimate of a vector of information symbols carried by optical signals propagating along a multi-core fiber in an optical fiber transmission channel according to two or more cores is provided. The decoder is implemented in an optical receiver. The optical signals are encoded using a space-time coding scheme and/or scrambled by at least one scrambling device arranged in the optical fiber transmission channel according to a predefined scrambling function. The decoder comprises a processing unit configured to adaptively: determine, in response to a temporal condition, one or more channel quality indicators from the optical signals; determine a decoding algorithm according to a target quality of service metric and on the one or more channel quality indicators; update the predefined scrambling function and/or the space-time coding scheme depending on the target quality of service metric and on the one or more channel quality
(Continued)

indicators. The decoder further comprises a symbol estimation unit configured to determine an estimate of a vector of information symbols by applying the decoding algorithm to the optical signals.

13 Claims, 8 Drawing Sheets

(58) Field of Classification Search
CPC .. H04B 10/60; H04B 10/07953; H04B 10/25; H04B 7/0695; H04B 10/50; H04J 14/04
USPC ............................. 398/25, 28, 141, 142, 202
See application file for complete search history.

(56) References Cited

OTHER PUBLICATIONS

Lenstra, et al., "Factoring Polynomials with Rational Coefficients", Mathematic Annals, vol. 261, pp. 515-534, 1982.
Abouseif, et al., "Core Mode Scramblers for ML-Detection Based Multi-Core Fibers Transmission", 2017 Asia Communications and Photonics Conference (ACP), 2017.
Chandrasekhar, et al., "WDM/SDM transmission of 10 × 128-GB/s PDM-QPSK over 2688-km 7-core fiber with a per-fiber net aggregate spectral-efficiency distance product of 40,320 km.b/s/Hz", Optics Express, vol. 20, No. 2, pp. 706-711, 2012.
Takahashi, et al., "First demonstration of MC-EDFA-repeatered SDM transmission of 40 × 128-Gbit/s PDM-QPSK signals per core over 6,160-km 7-core MCF", Optics Express, vol. 21, Issue 1, pp. 789-795, (2013).

* cited by examiner

DEVICES AND METHODS FOR ADAPTIVE DECODING AND CORE SCRAMBLING IN MULTI-CORE FIBER TRANSMISSION SYSTEMS

CROSS-REFERENCE TO RELATED APPLICATIONS

This application is a National Stage of International patent application PCT/EP2019/073610, filed on Sep. 4, 2019, which claims priority to foreign European patent application No. EP 18306214.0, filed on Sep. 18, 2018, the disclosures of which are incorporated by reference in their entirety.

TECHNICAL FIELD

The invention generally relates to optical communications and in particular to devices and methods for decoding optical signals in core scrambled multi-core fiber transmission systems.

BACKGROUND

World wide spread of various mobile terminals and data services is continuously increasing and generating a growing traffic demanding for more network capacity. Optical fiber transmissions appear as key technologies to meet such continuous demand for higher transmission data rates in global telecommunication infrastructures.

Optical fibers represent optical waveguides that guide electromagnetic waves in the optical spectrum. Light propagates in the fiber, following a succession of internal reflections. Light carries data and allows transmission over long distances at higher bandwidths than in wire-based or wireless communication systems.

The transmission capacity of conventional single-mode single-core fibers has increased in the past few decades using a variety of advanced technologies and signal processing techniques. Recent single-mode single-core transmission systems have achieved a transmission capacity up to 100 Tb/s. However, such capacity of conventional single-mode single-core fibers is approaching its fundamental limit and may no longer satisfy the growing demand for higher network capacity.

In order to further increase the fiber capacity and cope with the problem of capacity saturation of single-mode single-core fibers, space division multiplexing (SDM) has been proposed in T. Morioka, "New generation optical infrastructure technologies: "EXAT initiative" towards 2020 and beyond," presented at the OptoElectronic Communication Conference, Hong Kong, 2009, Paper FT4". In SDM transmission systems, space in the fiber is used as a multiplexing dimension for the creation of a set of independent spatial channels over which independent data streams can be multiplexed and simultaneously transmitted.

SDM systems enable increased capacity for high speed communications. Space division multiplexing is expected to be a key technology both for dealing with the future capacity limitation facing conventional single-mode single-core fibers and for providing a sustainable optical network capable of accommodating different traffics originating from different networks such as future 5G communication networks, Internet of Thing devices, and machine-to-machine communication networks.

Introducing space division multiplexing into a fiber can be performed using two approaches. A first approach consists in using multiple different modes in a fiber, referred to as a few-mode fiber (FMF) or a multi-mode fiber (MMF). A second approach consists in incorporating multiple separate cores in a single fiber, referred to as a multi-core fiber (MCF). Each core of a multi-core fiber may comprise a single mode or two or more modes.

Multi-mode fibers allow the propagation of light according to different spatial propagation modes. The core of a multi-mode fiber is enlarged to allow the propagation of more than one spatial mode. The number of reflections created as the light passes through the core increases, creating the ability to propagate more data at a given time slot.

Multi-mode fibers offer higher transmission rates than single-mode fibers. However, multi-mode fibers are affected by several impairments mainly due to imperfections of the optical components (e.g. fibers, amplifiers, spatial mode multiplexers), the crosstalk effects between the spatial modes, and non-unitary crosstalk effects known as mode dependent loss (MDL).

Multi-core fibers incorporate multiple identical or different cores in a single fiber. Multi-core fibers can be classified into uncoupled and coupled MCFs.

In uncoupled MCFs, each core has to be suitably arranged to keep the inter-core crosstalk sufficiently small for long distance transmission applications to detect signals from each core separately (i.e. no multiple-input multiple-output equalization is required at receiver). Several types of uncoupled multi-core fibers have been designed according to different core arrangements. These designs comprise 'homogeneous MCFs' and 'homogeneous with trench-assisted MCFs' incorporating multiple identical cores, and heterogeneous MCFs' incorporating multiple cores of several types.

In coupled MCFs, several cores are placed so that they strongly and/or weakly couple with each other. Coupled MCFs supporting a single spatial mode and multiple spatial modes can be used in high-power fiber laser applications.

Multi-core fibers are affected by several impairments due to the misalignment losses and crosstalk effects that induce a core dependent loss (CDL). The CDL is an impairment effect similar to the MDL affecting multi-mode fibers.

The misalignment losses rise due to the imperfections of the optical fiber at the splices and connector part. Three types of misalignment losses exist comprising the longitudinal displacement losses, the transverse displacement losses, and angular displacement losses.

The crosstalk effect is due to the existence of multiple cores in one cladding which generates a crosstalk between the neighboring cores. The crosstalk increases with a smaller inter-core distance and represents the main limitation to the capacity in terms of the optical signal quality and the number of cores integrated inside a multi-core fiber.

Optical solutions can be applied during the manufacturing of the optical fibers in order to reduce the crosstalk effect.

A first approach consists in increasing the inter-core distance. This approach enables reducing the crosstalk effect, however it limits the number of cores inside the fiber due to the cladding diameter and consequently it decreases the core density and capacity.

A second approach is based on trench assistance with the use of trench-assisted homogeneous multi-core fibers. Trench assistance reduces the coupling coefficients by surrounding each core with a low-index trench layer. The crosstalk in trench-assisted fiber designs is independent of the inter-core distance.

A third solution uses heterogeneous MCFs in which an intrinsic index difference between neighbor cores is introduced, enabling reducing the crosstalk effect.

Further, a random core scrambling technique, disclosed in "A. Abouseif, G. Rekaya-Ben Othman, and Y. Jaouen, Core Mode Scramblers for ML-detection based Multi-Core Fibers Transmission, in Asia Communications and Photonics Conference, OSA Technical Digest, 2017", has been recently proposed to mitigate the CDL in heterogeneous trench-assisted MCFs and to enhance the system performance. It is demonstrated that random core scrambling enables achieving better performance in terms of error probabilities; however random scrambling requires installing a large number of random scramblers which induces an additional implementation complexity and cost on the transmission system.

From a signal processing point of view, existing works on signal decoding in optical transmission systems consider the whole MIMO system and are based on the use of Maximum-Likelihood (ML) decoding at optical receivers for decoding optical signals. ML decoding provides optimal performance in terms of decoding error probability. However, its high computational complexity inhibits its implementation in realistic transmission systems.

Existing scrambling solutions enable a reduction of the crosstalk in multi-core fibers. However, they do not enable a complete mitigation of the CDL effects. Further, ML decoding of optical signals transmitted over an optical fiber-based transmission channel in which core scrambling is used requires high computational complexity at the receiver side.

There is accordingly a need for improved decoding techniques enabling the decoding of optical signals transmitted over a multi-core fiber-based SDM system while requiring a low-complexity decoding and enabling a complete mitigation of CDL effects.

SUMMARY

In order to address these and other problems, there is provide a decoder for determining an estimate of a vector of information symbols carried by optical signals propagating along a multi-core fiber in an optical fiber transmission channel according to two or more cores. The decoder is implemented in an optical receiver. The optical signals are encoded using a space-time coding scheme and/or being scrambled by at least one scrambling device arranged in the optical fiber transmission channel according to a predefined scrambling function. The decoder comprises a processing unit configured to adaptively:
 determine, in response to a temporal condition, one or more channel quality indicators from the optical signals;
 determine a decoding algorithm according to a target quality of service metric and on the one or more channel quality indicators;
 update said predefined scrambling function and/or the space-time coding scheme depending on the target quality of service metric and on the one or more channel quality indicators.

The decoder further comprises a symbol estimation unit configured to determine an estimate of a vector of information symbols by applying the decoding algorithm to the optical signals.

According to some embodiments, the target quality of service metric may be chosen in a group comprising a target symbol error rate and a target transmission rate.

According to some embodiments, the channel quality indicator may be chosen in a group comprising a signal-to-noise ratio, a conditioning number of a channel state matrix representing said optical fiber transmission channel, a channel outage probability, the orthogonality defect factor of the channel state matrix, and a core dependent loss value.

According to some embodiments, the decoding algorithm may be chosen in a group comprising a Zero Forcing decoding algorithm, a Zero Forcing-Decision Feedback decoding algorithm, a Minimum Mean Square Error decoding algorithm, and a parameterized spherical-bound stack decoder.

According to some embodiments, the decoding algorithm may comprise a preprocessing stage consisting in applying a lattice reduction algorithm and/or a Minimum Mean Square Error-Generalized Decision Feedback equalizer filtering.

According to some embodiments, the decoder may comprise a storage unit configured to store a look-up table comprising a set of values of quality of service metrics, a set of intervals of values of channel quality indicators, a set of random and deterministic scrambling functions, and a set of decoding algorithms. Each scrambling function may be associated with one or more intervals of values of channel quality indicators. Each interval of values of channel quality indicators may be associated with one or more decoding algorithms. Each of the one or more decoding algorithms may be associated with a value of quality of service metric. In such embodiments, the processing unit may be configured to determine the decoding algorithm, for the predefined scrambling function, by selecting, among the set of decoding algorithms associated with an interval of values of channel quality indicators in which the one or more channel quality indicator takes value, the decoding algorithm that is associated with a value of quality of service metric that is higher than or equal to the target quality of service metric.

According to some embodiments, the processing unit may be configured to update the predefined scrambling function by selecting, among the set of scrambling functions stored in the look-up table, a scrambling function depending on the target quality of service metric with respect to the set of values of quality of service metrics and depending on the one or more channel quality indicators with respect to the set of intervals of values of channel quality indicators.

According to some embodiments, the decoder may comprise a quality of service metric update unit configured to measure a quality of service metric in response to a temporal condition, the storage unit being configured to update the set of values of quality of service metrics stored in the look-up table from the measured quality of service metrics.

According to some embodiments, the processing unit may be configured to update a target quality of service metric depending on the value of the target quality of service metric with respect to a measured quality of service metric, the update of the target quality of service metric comprising:
 increasing the target quality of service metric if the target quality of service metric is lower than the measured quality of service metric, and
 decreasing the target quality of service metric if the target quality of service metric is higher than the measured quality of service metric.

According to some embodiments, each core comprised in the multi-core fiber may be associated with one or more parameters chosen in a group comprising a core type and a core loss value, a scrambling function being applied to permute the two or more cores depending on one or more of the core parameters associated with the two or more cores.

According to some embodiments, the two or more cores may be ordered according to a given order of the core loss values associated with the two or more cores, the scrambling function corresponding to a two-by-two permutation of the two or more cores depending on the order of the core loss values associated with the two or more cores.

According to some embodiments, the multi-core fiber may be heterogeneous comprising at least two cores associated with different core types. In such embodiments, the scrambling function may correspond to a two-by-two permutation of the two or more cores according to the permutation of at least a first core with a second core, the first core and the second core being associated with different core types.

There is also provided a decoding method for determining an estimate of a vector of information symbols carried by optical signals propagating along a multi-core fiber in an optical fiber transmission channel according to two or more cores. The optical signals are encoded using a space-time coding scheme and/or are scrambled by at least one scrambling device arranged in the optical fiber transmission channel according to a predefined scrambling function. The decoding method comprises adaptively:

- determining, in response to a temporal condition, one or more channel quality indicators from the optical signals;
- determining a decoding algorithm according to a target quality of service metric and depending on the one or more channel quality indicators;
- updating the predefined scrambling function and/or the space-time coding scheme depending on said target quality of service metric and on the one or more channel quality indicators.

The decoding method further comprises determining an estimate of a vector of information symbols by applying the decoding algorithm to the optical signals.

Advantageously, the embodiments of the invention provide low-complexity core scrambling techniques and low-complexity coding schemes and decoding schemes implemented in optical receivers enabling a complete mitigation of the CDL effects impacting a multi-core fiber-based transmission system while achieving decoding performance approaching optimal performance obtained by applying Maximum Likelihood decoding.

Advantageously, the embodiments of the invention provide efficient adaptive selection of low-complexity decoding algorithms implemented in optical receivers and adaptive selection of low-complexity core scrambling techniques and/or space-time coding techniques enabling achieving a target quality of service taking into account the quality of the transmission channel.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

DETAILED DESCRIPTION

Figure 1:
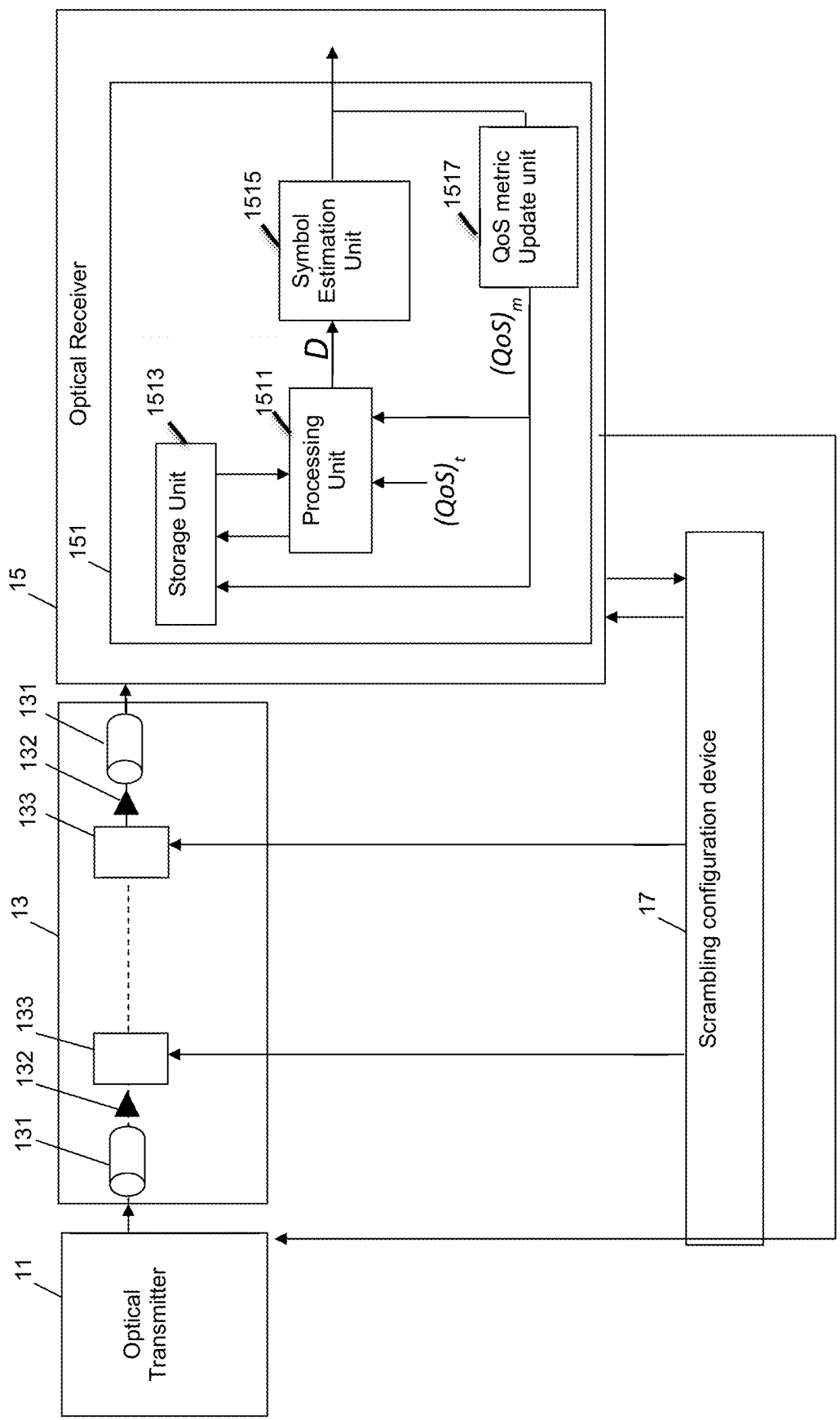
FIG. 1 is a schematic diagram of an exemplary application of the invention to optical communication systems.

Embodiments of the invention provide a multi-core optical fiber transmission system implementing low-complexity scrambling devices (random or deterministic). Embodiments of the invention further provide methods enabling a reduction of the crosstalk and misalignment losses impacting the multi-core fiber. There is also provided low-complexity decoding devices and methods enabling an adaptive selection of decoding algorithms according to quality of service requirements/specifications and taking into account the quality of the transmission channel, while achieving near-ML decoding performance. The embodiments of the invention further provide an adaptive selection/update of the core scrambling function implemented in scrambling devices for core scrambling and/or an adaptive selection of a space-time coding according to target quality of service specifications and depending on the transmission channel quality.

Devices and methods according to the various embodiments of the invention may be implemented in optical fiber transmission systems applied to a wide variety of applications. Exemplary applications comprise, without limitation, optical fiber communications (e.g. data center transmission cables, inter-chip communications), aerospace and avionics, data storage, automotive industry, imaging, transportation, sensing (e.g. 3D shape sensing, downhole sensing in oil exploration applications), next generation optical amplifiers, monitoring (e.g. pipeline monitoring, structural health monitoring) and photonics.

Exemplary communication applications comprise desktop computers, terminals, access, metro, and nationwide optical networks. Optical fibers may be used to transmit light and thus information/data over short distances (less than one meter) or long distances (up to hundreds or thousands of kilometers for example in communications over metropolitan networks, wide area networks, transoceanic links). Such applications may involve transfer of voice (e.g. in telephony), data (e.g. data supply to homes and offices known as fiber to the home), images or video (e.g. transfer of internet traffic), or connection of networks (e.g. connection of switches or routers and data center connectivity in high-speed local area networks).

In an exemplary implementation of the invention in the field of aerospace and avionics industries, optical fiber-based products may be used in military and/or commercial applications. Optical fiber technologies and products are designed in such applications to meet rigorous testing and certifications requirements in harsh environments and conditions.

In an exemplary implementation of the invention in data storage applications, optical fibers may be used in data storage equipments as a link between multiple devices in a network and/or as part of a storage system. Optical fiber connectivity offers very high bandwidth even over extended distances.

In another exemplary application of the invention to automotive industry, optical fiber technologies may be used for example in communications, and sensing for safety and control devices and systems.

In still another exemplary application of the invention to imaging applications (e.g. telemedicine), the optical transmission properties of the optical fibers may be used to transmit an image of a target or a subject area to the image view end for analysis and/or interpretation.

The invention may be used also in transportation systems, in which smart highways with intelligent traffic lights, automated tollbooths and changeable message signs may use telemetry systems based on optical fibers.

The invention may further be used in sensing applications, where optical fiber sensors are used for sensing some quantities such as temperatures, displacements, vibrations, pressure, acceleration, rotations, and concentration of chemical species. Exemplary applications of optical fiber sensors comprise sensing in high voltage and high-power machinery or in microwaves, distributed temperature and strain measurements in buildings for remote monitoring (e.g. monitoring of the wings of airplanes, wind turbines, bridges, pipelines), downhole sensing in oil exploration applications, etc.

In another application of the invention to photonics, optical fibers may be used for connecting components in optical fiber devices, such as interferometers and fiber lasers.

In such application, optical fibers play a similar role as electrical wires do in electronic devices.

The following description of certain embodiments will be made with reference to communication applications, for illustration purposes only. However, the skilled person will readily understand that the various embodiments of the invention may be applied to other types of systems for different applications.

FIG. 1 illustrates an exemplary implementation of the invention in an optical transmission system 100 (also referred to as 'optical communication system') based on optical fiber transmissions. The optical transmission system 100 comprises at least one optical transmitter device 11 (hereinafter referred to as an "optical transmitter") configured to encode an input data sequence into an optical signal and transmit the optical signal optically to at least one optical receiver device 15 (hereinafter referred to as an "optical receiver") through an optical fiber transmission channel 13 (hereinafter referred to as an 'optical fiber link') configured to transmit the light over some distance.

The optical communication system 100 may comprise computers and/or softwares to control the system operability.

The optical fiber transmission channel 13 comprises a multi-core fiber comprising a concatenation of a plurality of fiber sections 131 (also referred to as 'fiber span' or 'fiber slice'). The fiber sections 131 may be aligned or misaligned.

The multi-core fiber is a cylindrical non-linear optical waveguide consisting of two or more cores, a cladding surrounding the two or more cores, and a coating. Each core has a refractive index. The optical signal sent by the optical transmitter 11 is multiplexed and is guided in each core of the multi-core fiber through total internal reflections due to the difference between the refractive indices of the cores and the refractive index of the cladding.

In some embodiments in which the multi-core fiber is an uncoupled fiber, each core of the multi-core fiber may act as a separate waveguide such that the optical signal can be considered as propagating independently trough the cores.

In some embodiments in which the multi-core fiber is a coupled fiber, some coupling may exist between the cores if the distance between two cores is so small that the optical signals propagating along the different cores overlap.

The optical fiber may be made of glass (e.g. silica, quartz glass, fluoride glass), typically for long-distance transmissions. For short distance transmissions, the optical fiber may be a plastic optical fiber.

The multi-core fiber may be characterized by geometrical parameters and optical parameters. Geometrical parameters may comprise the cladding diameter, the core-to-core distance, and the core-outer cladding distance. Optical parameters may comprise the wavelength, the crosstalk coefficients representing the crosstalk between the different cores of the multi-core fiber, and the refractive index difference between each core and the cladding.

In some embodiments, the optical fiber communication system 100 may operate in a wavelength region corresponding to a region chosen in a group comprising:
  the window of wavelengths ranging in 800-900 nm, suitable for short-distance transmissions;
  the window of wavelengths around 1.3 µm, used for example for Fiber To The Frontage applications;
  the window of wavelengths around 1.5 µm, more used for example for long-haul transmissions since the losses of silica fibers are lowest in this wavelength region (lowest attenuation window).

Figure 2:
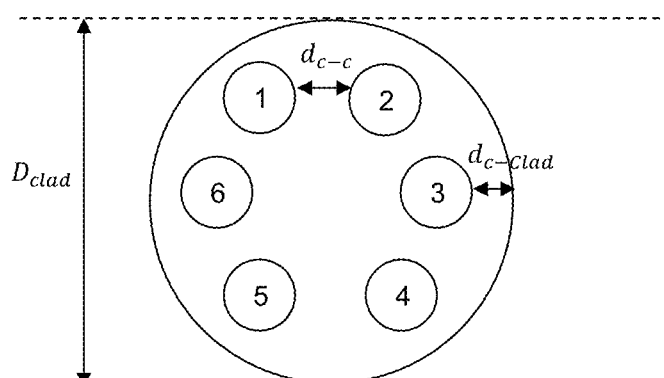
FIG. 2 illustrates a cross section of an exemplary multi-core fiber.

FIG. 2 depicts a cross section of a six-cores fiber, $D_{clad}$ representing the cladding diameter, $d_{c-c}$ designating the inter-core distance, and $d_{c\text{-}clad}$ representing the core-outer cladding distance.

In some embodiments, the cores in the multi-core fiber may be arranged on a ring around the fiber axis for example on the edges of a hexagon. In other embodiments, the cores may be arranged on some 2-dimensional grid.

In an embodiment, the multi-core fiber may be a homogeneous multi-core fiber comprising two or more cores of identical types.

Figure 3:
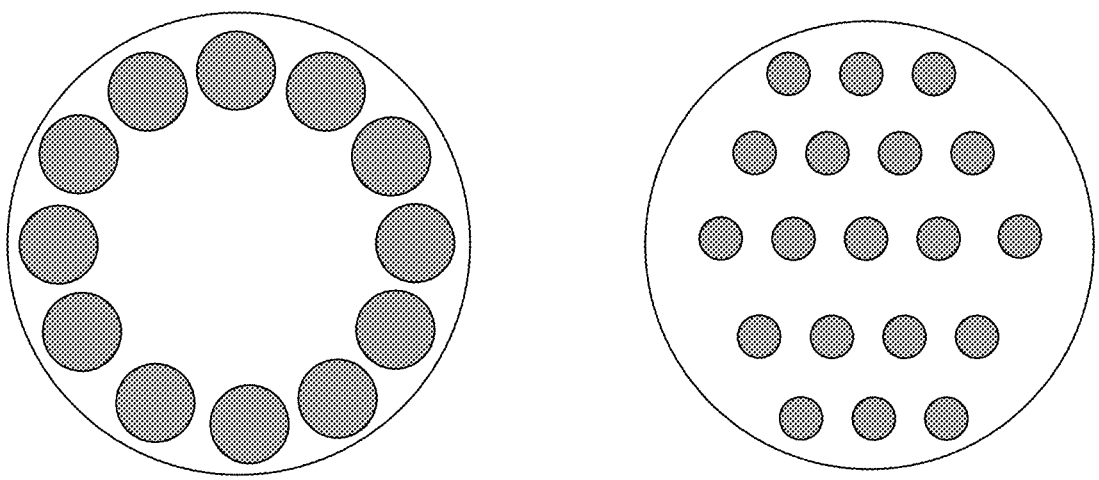
FIG. 3 depicts cross sections views of multi-core fibers, with a 12-cores homogeneous multi-core fiber comprising twelve cores arranged on a ring around the fiber axis and a 19-cores homogeneous fiber comprising nineteen cores arranged in a two-dimensional grid comprising a central core, according to some embodiments.

FIG. 3 depicts two cross sections of two exemplary homogeneous multi-core fibers, a first 12-cores fiber comprising 12 cores of identical types arranged on a ring around the fiber axis, and a second 19-cores fiber comprising 18 cores arranged on the edges of the hexagon and a central core.

In an embodiment, the multi-core fiber may be a homogeneous trench-assisted multi-core fiber, each core being surrounded by a low-index trench layer.

Figure 4:
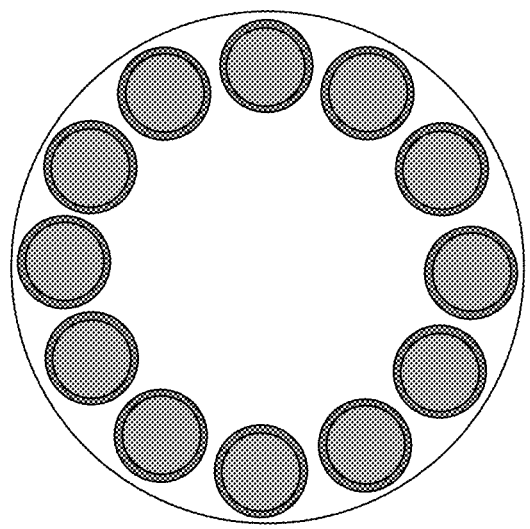
FIG. 4 is a cross section view of a multi-core fiber, according to some embodiments in which the multi-core fiber is a 12-cores homogeneous trench-assisted multi-core fiber.

FIG. 4 illustrates a cross section of an exemplary trench-assisted homogeneous multi-core fiber comprising 12 cores of identical types.

In another embodiment, the multi-core fiber may be a heterogeneous multi-core fiber comprising a plurality of cores among which at least two cores are of different types.

Figure 5:
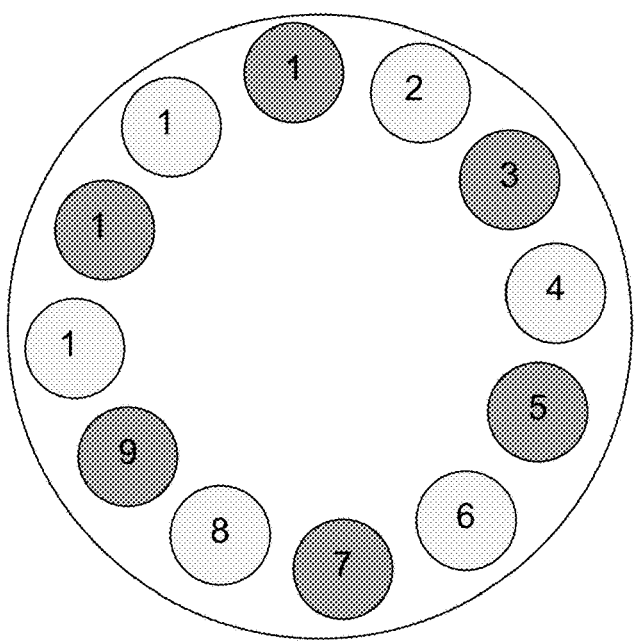
FIG. 5 is a cross section view of a multi-core fiber, according to some embodiments in which the multi-core fiber is a 12-cores heterogeneous multi-core fiber comprising twelve cores arranged on a ring around the fiber axis.

FIG. 5 illustrates a cross section of an exemplary heterogeneous multi-core fiber comprising 12 cores among which cores numbered $2i+1$ with $i=0, \ldots, 5$ are identical, the cores numbered $2i+2$ with $i=0, \ldots, 5$ are identical, and the cores numbered $2i+1$ are of a core type different from the core type of the cores numbered $2i+2$ for $i=0, \ldots, 5$. Each core in such heterogeneous multi-core fiber has two neighbors, each core having a core type different from the core type of its neighbor cores.

Figure 6:
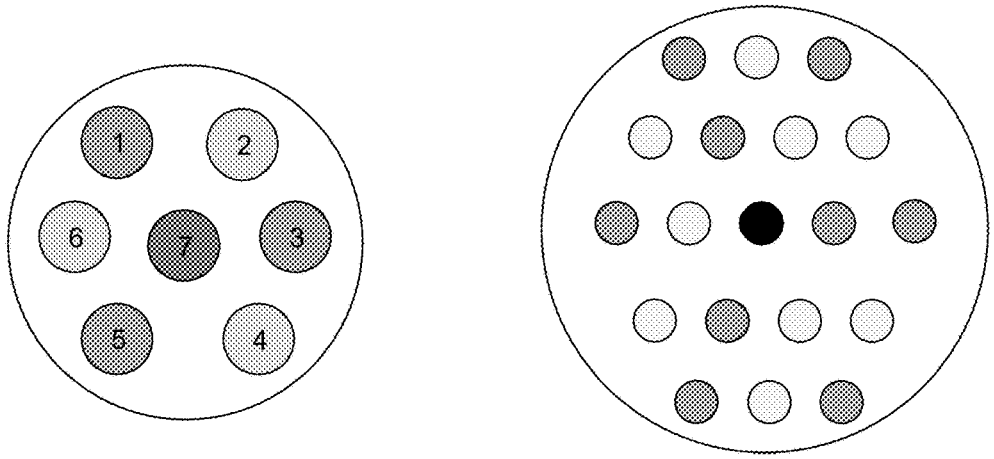
FIG. 6 represents cross sections views of multi-core fibers, with a 7-cores heterogeneous fiber comprising seven cores and a 19-cores heterogeneous fiber comprising three groups of cores, the cores of each the different groups having different types, according to an embodiment.

FIG. 6 illustrates two cross sections of two exemplary 7-cores fiber and 19-cores heterogeneous fibers. The 7-cores fiber comprises six cores on the edges of the hexagon numbered 1-6 and a central core numbered 7. This 7-cores fiber involves three different core types, the central core having a core type different from the types of the cores on the edges of the hexagon, and each core arranged on the edges of the hexagon having a core type different from the core type of its neighbor cores. The 19-cores fiber comprises three different core types, the central core having a core type different from the types of the cores on the edges of the hexagon.

In an embodiment, the multi-core fiber may be a trench-assisted heterogeneous multi-core fiber.

Figure 7:
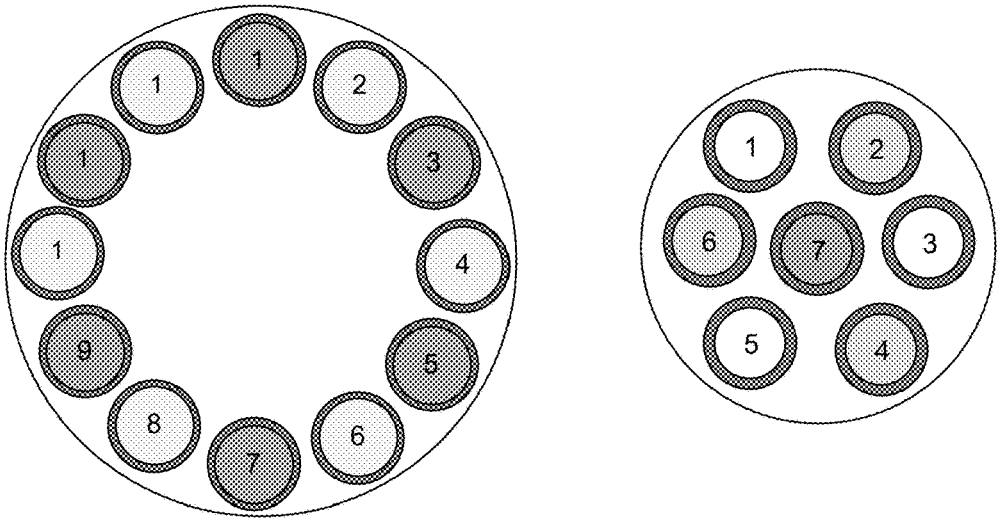
FIG. 7 represents cross sections view of multi-core fibers, with a 12-cores heterogeneous trench-assisted multi-core fiber comprising twelve cores arranged on a ring around the fiber axis and a 7-cores heterogeneous trench-assisted, according to some embodiments.

FIG. 7 depicts cross sections of two exemplary 12-cores and 7-cores trench-assisted heterogeneous multi-core fibers.

In some embodiments, each core of the multi-core fiber may be single mode comprising one spatial propagation mode.

In some embodiments, the multi-core fiber may comprise at least one multi-mode core comprising two or more spatial propagation modes.

In some embodiments, each core in the fiber may be associated with one or more core parameters, a core parameter being chosen in a group comprising a core type and a core loss value, the core value quantifying the loss experienced by the core in terms of the inter-core crosstalk (e.g. the crosstalk between the core and its neighbor cores) and the misalignment losses.

The optical fiber transmission channel 13 may further comprise one or more amplifiers 132 inserted in the fiber for re-amplifying the optical power and compensating for the fiber attenuation without the need to regenerate the optical signals such that a sufficient signal power can be maintained over large distance where optical signals need to be periodically amplified.

The amplifiers 132 may be inserted between each pair of fiber slices 131. In particular, an amplifier 132 inserted at the end of the optical fiber transmission channel performs signal amplification before signal detection at the receiver 15.

Each amplifier 132 may be configured to simultaneously amplify the optical signal corresponding to the plurality of cores in the multi-core fiber.

In some embodiments, the amplifiers 132 may consist of a duplication of a single core fiber amplifier.

In other embodiments, an amplifier 132 may be an optical multi-core amplifier. Exemplary optical amplifiers comprise multi-core Erbium doped fiber amplifiers (EDFAs) such as core-pumped multi-core EDFAs and cladding-pumped EDFA amplifiers. Core-pumped and cladding pumped amplifiers may use a single or a plurality of pump diodes. In particular, a pump diode per core may be used in EDFA amplifiers.

In some embodiments, the optical signal amplification may be performed in a distributed manner using the non-linear simulated Raman scattering effect. In such embodiments, the fiber is used as both a transmission link and an amplification medium.

In other embodiments, signal amplification may be achieved by a joint use of regularly arranged optical amplifiers and of simulated Raman Scattering effects.

In still other embodiments, the signal amplification may be performed in the electrical domain through an optical/electrical conversion (not illustrated in FIG. 1). In such embodiments, the optical fiber transmission channel 13 may comprise, at each amplification stage:
- a photodiode for converting the optical signal back to the electrical domain;
- an electrical amplifier for amplifying the converted electrical signal; and
- a laser diode for generating an optical signal corresponding to the amplified electrical signal.

According to some embodiments (not illustrated in FIG. 1), the optical transmission channel 13 may further comprise one or more of:
- dispersion compensators for counteracting the effects of chromatic dispersion, a dispersion compensator being configured to cancel the chromatic dispersion or compensate the dispersion for example before the detection of the optical signal at the receiver 15;
- optical switches and multiplexers such as optical add/drop multiplexers implemented in wavelength division multiplexing systems;
- one or more devices for regenerating the optical signal such as electronic and optical regenerators.

In some embodiments in which core scrambling is performed in the optical domain using optical devices, optical multiplexers may be used as core scramblers.

Figure 8:
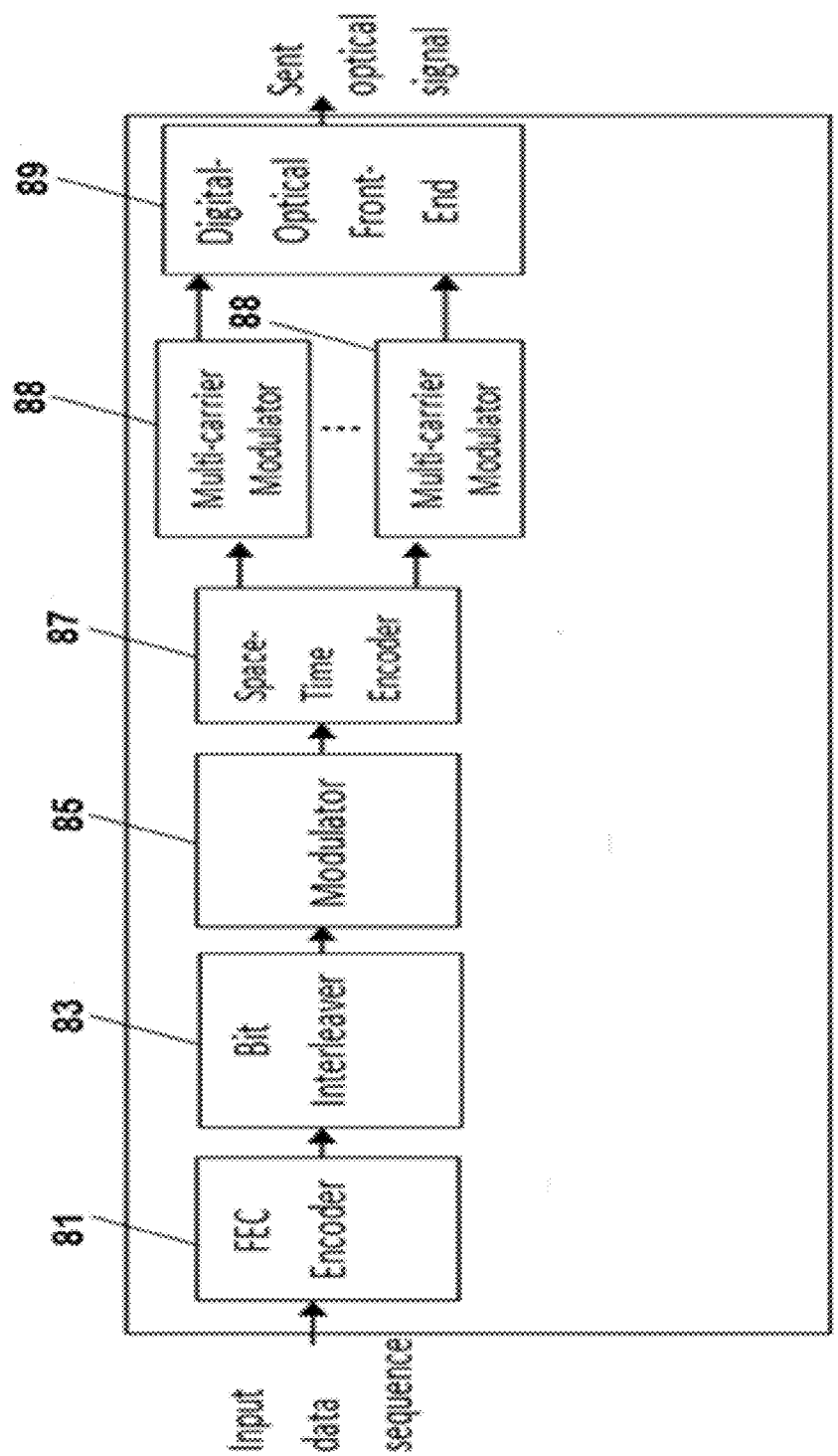
FIG. 8 is a block diagram illustrating the structure of an optical transmitter according to some embodiments of the invention.

FIG. 8 shows the components of an optical transmitter 11 according to some embodiments. The optical transmitter 11 may be configured to transform an input data sequence into an optical signal to be transmitted through the optical transmission channel 13. Accordingly, the optical transmitter 11 may comprise:
- a Forward Error Correcting code (FEC) encoder 81 (also referred to as 'an error correcting code encoder 81') configured to encode an input data sequence of length k (i.e. comprising k symbols) into an encoded sequence in the form of a codeword vector of length $n>k$ by applying at least one Forward Error Correcting code (FEC) (also referred to as 'an error correcting code');

an interleaver 83 configured to mix the encoded sequence to add a protection layer to the encoded symbols against burst errors before being modulated;

a modulator 85 configured to determine a set of modulated symbols in a form of a modulated symbol vector $s_c$ by applying a modulation scheme. to the interleaved encoded sequence (or to the codeword vectors in embodiments where the transmitter 11 does not comprise an interleaver). Different modulation schemes may be implemented such as $2^q$-QAM or $2^q$-PSK with $2^q$ symbols or states. The modulated vector $s_c$ may be a complex-value vector comprising κ complex-value symbols $s_1, s_2, \ldots, s_k$, with q bits per symbol. When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet A=[−(q−1), (q−1)];

a Space-Time Encoder 87 configured to determine a codeword matrix carrying the data symbols to be sent through the optical transmission channel 13 during a Time Transmission Interval (TTI) by applying a Space-Time code. The Space-Time encoder 25 may be configured to transform each received sequence (or block) of Q modulated symbols $s_1, s_2, \ldots, s_q$ into a codeword matrix X of dimensions $N_c$xT. A codeword matrix comprises complex values arranged in $N_c$ rows and T columns where $N_c$ designates the number of propagation cores used for propagating optical signals and T designates the temporal length of the Space-Time code and corresponds to the number of temporal channel uses. Each value of a codeword matrix accordingly corresponds to a time of use and to a propagation core used for the signal propagation.

The Space-Time Encoder 87 may use a linear Space-Time Block Code (STBC) to generate the codeword matrix. The coding rate of such codes is equal to $$\frac{\kappa}{T}$$

complex symbols per channel use, where K is the number of encoded complex-value symbols composing the vector $s_c = [s_1, s_2, \ldots, s_\kappa]^t$ of dimension κ in this case. When full-rate codes are used, the Space-Time Encoder 87 encodes $\kappa=N_cT$ complex-value symbols. Examples of STBCs are the Perfect Codes. The Perfect Codes provide full coding rates by encoding a number $\kappa=N_c^2$ (T=$N_c$) of complex information symbols and satisfy a non-vanishing determinant property.

In some embodiments, the Space-Time Encoder 87 may use a spatial multiplexing scheme known as V-BLAST scheme by multiplexing the received complex-value information symbols over the different propagation cores, without performing a coding in the time dimension.

According to some embodiments, the input data sequence may be a binary sequence comprising k bits. The FEC encoder 81 may be configured, in such embodiments, to encode the input binary sequence into a binary codeword vector comprising n bits by applying at least one binary FEC code.

In other embodiments, the input data sequence may comprise symbols that take values in a Galois Field GF(q) with q>2 representing the order of the Galois Field. In such embodiments, the FEC encoder 22 may be configured to encode the input data sequence into a codeword vector comprising n symbols, each symbol comprised in the codeword vector takes value in the Galois Field GF(q). The encoding process in this case may be performed using a non-binary FEC code constructed over GF(q) with q>2.

By performing the coding operation, the FEC encoder 81 adds redundant bits (in general redundant symbols) to the input binary sequence so that the receiver can detect and/or correct common transmission errors. The use of a FEC code provides an additional protection and immunity against transmission errors and allows significant improvement in performance with respect to uncoded transmission (i.e. transmission of modulated data without FEC encoding).

Additional improvements and reduction on the probability of error may be achieved through the concatenation of two or more FEC codes. Concatenation of codes may follow a serial, a parallel, or a multi-level architecture. The FEC encoder 81 may be accordingly configured to implement two or more FEC codes.

The optical transmitter 11 may further comprise a plurality of multi-carrier modulators 88 configured to generate multi-carrier symbols by implementing a multi-carrier modulation technique within each optical carrier involving a large number of orthogonal sub-carriers. Moreover, multi-carrier modulations may be implemented for providing a better resistance to the inter-symbol interference resulting from the fiber dispersion and crosstalk between the various cores in the multi-core fiber. Exemplary multi-carrier modulation formats comprise Orthogonal Frequency Division Multiplexing (OFDM) and Filter Bank Multi-Carrier (FBMC).

The frequency-domain signal delivered by the multicarrier modulators 88 may be then processed by a digital-optical Front-End 89 configured to convert the received frequency-domain signal to the optical domain. The digital-optical Front-End 88 may perform the conversion using a number of lasers of given wavelengths and a plurality of optical modulators (not shown in FIG. 8) associated with the used polarization states and the spatial propagation modes in the cores of the multi-core fiber. A laser may be configured to generate a laser beam of a same or different wavelength using Wavelength Division Multiplexing (WDM) techniques. The different laser beams may be then modulated using the different outputs of the OFDM symbols (or the different values of the codeword matrix in embodiments using single-carrier modulations) by means of the optical modulators and polarized according to the different polarization states of the fiber. Exemplary modulators comprise Mach-Zehnder modulators. A phase and/or amplitude modulation may be used. In addition, the modulation scheme used by the various optical modulators for modulating the different optical signals may be similar or different.

The number of the optical modulators and lasers depends on the number of used polarization states, the number of used propagation modes in each core of the multi-core fiber, and on the number of cores in the fiber.

The digital-optical front-end 88 may further comprise a FAN-IN device (not illustrated in FIG. 8) configured to inject the generated optical signals into each core of the multi-core fiber to propagate according to the available propagation modes in each core. Optical connectors may be used to connect the output end of the FAN-IN device and the input end of the multi-core optical transmission channel 13.

The optical signals generated according to any of the preceding embodiments may propagate along the fiber until reaching the other end of the optical transmission channel 13 where it is processed by an optical receiver 15.

Figure 9:
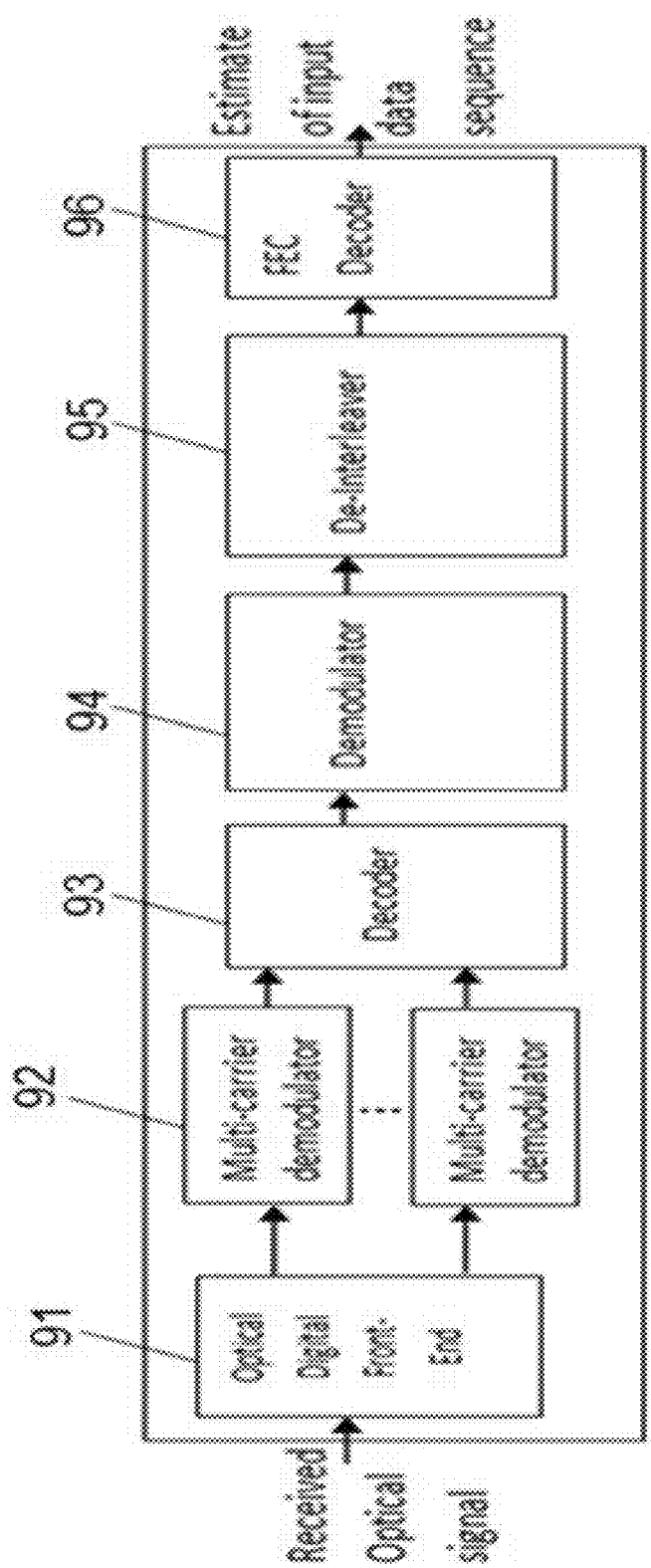
FIG. 9 is a block diagram illustrating the structure of an optical receiver according to some embodiments of the invention.

FIG. 9 is a block diagram of an optical receiver 15 according to some embodiments. The optical receiver 15 is configured to receive the optical signal transmitted by the optical transmitter 11 through the transmission channel 13 and to generate an estimate of the original input data sequence. Accordingly, the optical receiver 15 may comprise:

- an optical-digital front-end 91 configured to detect the optical signals, using for example one or more photodiodes, and to convert them into a digital signal. The optical-digital front-end 91 may comprise a FAN-OUT device (not illustrated in FIG. 9);
- a plurality of multi-carrier demodulators 92 configured to remove the cyclic prefix and generate a set of decision variables to be delivered to the Space-Time decoder 93;
- a decoder 93 configured to generate an estimate of the modulated data sequence from the set of decision variables by applying a decoding algorithm;
- a demodulator 94 configured to generate a binary sequence by performing a demodulation of the modulated data sequence estimated by the decoder 93;
- a de-interleaver 95 configured to rearrange the order of the bits (in general the symbols) in the binary sequence delivered by the demodulator 94 to restore the original order of the bits; and
- a FEC decoder 96 (also referred to as 'an error correcting code decoder 96') configured to deliver an estimate of the input data sequence processed by the optical transmitter device 11 by applying a soft or hard-decision FEC decoder to the reordered binary sequence delivered by the de-interleaver 95. Exemplary soft-decision FEC decoders comprise the Viterbi algorithm.

In embodiments using single-carrier modulations, the plurality of multi-carrier modulators 92 may be replaced by a single modulator. Similarly, the multi-carrier demodulators 92 may be replaced by a single demodulator.

In some embodiments in which the FEC encoder 81 implements a concatenation of two or more forward error correcting codes, a corresponding structure may be implemented by the FEC decoder 96. For example, in embodiments based on a serial concatenation of an inner code and an outer code, the FEC decoder 96 may comprise an inner code decoder, a de-interleaver, and an outer code decoder (not shown in FIG. 9). In embodiments involving two codes in a parallel architecture, the FEC decoder 96 may comprise a de-multiplexer, a de-interleaver, and a joint decoder (not shown in FIG. 9).

The embodiments of the invention provide low-complexity decoders 93 implemented in an optical receiver 15 for determining an estimate $\hat{s}_c$ of the vector of information symbols $s_c$ carried by the optical signals propagating along the multi-core fiber spans 131 in the optical fiber transmission channel 100, the optical signals being encoded using a Space-Time code (also referred to a 'space-time coding scheme') and/or scrambled by one or more scrambling devices 133 according to a given/predefined scrambling function denoted by π. More specifically, the embodiments of the invention provide adaptive implementations of low-complexity decoders 93 and adaptive update of the predefined scrambling function π and/or of the space-time coding scheme implemented at the optical transmitter 11 according to quality of service requirements/specifications and depending on the quality of the optical fiber transmission channel 13 in a way that the decoding algorithm implemented at the decoder 93 enables achieving the specified quality of service requirements while requiring a low-computational complexity. The optical fiber transmission channel 13 is represented by a complex-value channel state matrix denoted by H.

The quality of service requirements/specifications may be set depending on the application for which the optical fiber transmission system 100 is used. The quality of service requirements may be defined by a target quality of service metric designated by $(QoS)_t$ previously determined/defined by a system manager/controller.

To facilitate the understanding of some embodiments of the invention, there follows some notations and/or definitions used hereinafter:

- L designates the total length of the multi-core fiber in the optical fiber transmission channel 13;
- K designates the number of fiber sections concatenated in the multi-core fiber (also referred to as 'fiber slices' or 'fiber spans');
- d designates a correlation length;
- $R_b$ designates a bending radius;
- $N_c \geq 2$ designates the total number of cores in the multi-core fiber, the cores being numbered (i.e. each core being associated with a core number varying between 1 and $N_c$) such that a core is designated as core-n with n taking value between 1 and $N_c$;
- $R_n$ designates the radius of core-n;
- each core core-n with n=1, . . . , $N_c$ is associated with core parameters denoted by $\{T_n; \lambda_{n,p}\}$, with $T_n$ designating the core type of core-n and $\lambda_{n,p}$ designating a core loss value associated with the core-n and resulting of the core scrambling;
- $XT_{n,m}$ refers to a crosstalk coefficient (also referred to as 'inter-core crosstalk coefficient') quantifying the crosstalk (also referred to as 'inter-core cross-talk') between the core-n and the core-m with n≠m;
- $k_{n,m}$ refers to a coupling coefficient (also referred to as 'inter-core coupling') quantifying the coupling (also referred to as 'inter-core coupling') between the core-n and the core-m with n≠m;
- $\Delta \beta_{nm}$ stands for the propagation constant difference between the core-n and the core-m with n≠m, and
- π designates a scrambling function used for core scrambling.

Referring to FIG. 1, there is provided a decoder 151 implemented in an optical receiver 15, the decoder 151 comprising a processing unit 1511 configured to adaptively:

- determine, in response to a temporal condition, one or more channel quality indicators denoted by CQI from the received optical signals;
- determine a decoding algorithm denoted by D depending on the target quality of service metric $(QoS)_t$ and on the determined one or more channel quality indicators CQI;
- update the predefined scrambling function π and/or the space-time coding scheme used at the optical transmitter 11 depending on the target quality of service metric $(QoS)_t$ and on the determined one or more channel quality indicators CQI. This means that the predefined scrambling function π initially implemented in the scrambling device(s) 133 arranged in the optical fiber transmission channel 13 and/or the space-time code used at the optical transmitter 11 may be updated during the operability of the transmission system 100 in order to achieve the specified quality of service requirements taking into account the quality of the transmission channel. The decoder 151 may be configured to communicate the updated scrambling function to the scrambling devices 133 via a direct link or via a scrambling configuration device 17 and to communicate the updated space-time code to the optical transmitter 11 via a feedback link.

The scrambling configuration device 17 may be configured to previously determine the predefined scrambling function $\pi$ depending on the fiber characteristics for example.

The decoder 151 further comprises a symbol estimation unit 1515 configured to determine an estimate $\hat{s}_c$ of the vector of information symbols $s_c$ by applying the decoding algorithm D to the optical signal denoted by Y received at the optical receiver 15.

According to some embodiments, the temporal condition may correspond to a continuous calculation of one or more channel quality indicators at each transmission/reception of an optical signal over the optical fiber transmission channel 13 or to a periodic calculation of one or more channel quality indicators for example at predefined time intervals that may be for example fixed, cyclic, or random.

In some embodiments, a predefined time interval may be a function of the coherence time of the transmission channel defined by the time during which a realization of the channel state matrix representing the transmission channel remains constant.

According to some embodiments, a channel quality indicator may be determined based on an average estimation of the components of the channel matrix, thus enabling the update of the space-time coding scheme to be selected for coding the information symbols at the optical transmitter 11.

According to some embodiments, a target quality of service metric $(QoS)_t$ may be chosen in a group comprising a target symbol error rate denoted by $SER_t$ and a target transmission rate denoted by $R_t$.

In an embodiment in which the target quality of service is measured in terms of error probability, the target quality of service metric $SER_t$ may correspond to the number of symbol errors per time unit. The metric $SER_t$ may be associated with a symbol error probability denoted by $P_{e,s}$ that indicates an expectation value of the symbol error ratio and is given by:

$$P_{e,s} = \cup_{i=1}^{\kappa} = Pr(\hat{s}_i \neq s_i) \quad (1)$$

In equation (1), $s_i$ and $\hat{s}_i$ denote respectively the transmitted and estimated symbols for $i=1, \ldots, \kappa$.

The transmission rate indicates how fast data can be transmitted over the optical fiber transmission channel 13. The transmission rate depends on the bandwidth available, the transmitted signal (i.e. the coding and modulation schemes), and on the level of noise impacting the transmission channel. A target transmission rate $R_t$ may be previously defined according to the used coding and modulation schemes at the optical transmitter.

According to some embodiments, a channel quality indicator CQI may be chosen in a group comprising a signal-to-noise ratio denoted by SNR, a conditioning number, denoted by $\tau(H)$, of a channel state matrix H representing the state of the optical fiber transmission channel 13, a channel outage probability denoted by $P_{out}(R)$, the orthogonality defect factor of the channel state matrix H, and a core dependent loss value denoted by CDL.

The signal-to-noise ratio SNR (at the optical receiver) is measured as the ratio of the power of the received signal to the noise power.

The conditioning number $\tau(H) \in [0,1]$ of a channel state matrix H is given by:

$$\tau(U) = \frac{\sigma_{min}}{\sigma_{max}} \quad (2)$$

In equation (2), $\sigma_{min}$ and $\sigma_{max}$ correspond respectively to the minimum and maximum singular values of the matrix H. The conditioning number of a given matrix designates an orthogonality measure indicative of the orthogonality of its column vectors.

A channel outage probability $P_{out}(R)$ indicates the probability that a given transmission rate R (bits/channel use) cannot be supported due to the variations of the channel. The probability of outage $P_{out}(R)$ of the channel is expressed as:

$$P_{out}(R) = Pr(C(H) < R) \quad (3)$$

In equation (3), C(H) designates the instantaneous channel capacity expressed by:

$$C(H) = \mathbb{E}_H \left\{ \log_2 \left( \det \left( I_{n_r} + \frac{SNR}{n_t} HH^t \right) \right) \right\} \quad (4)$$

The outage probability of the channel indicates the ability to decode the original symbols according to the quality of the transmission channel. If the instantaneous channel capacity satisfies $C(H) < R$ for a given transmission rate R, it is indicated that the channel quality is bad. As a result, the optical receiver may not be able to correctly decode the original symbols. If the instantaneous capacity is such that $C(H) \geq R$, it is indicated that the channel is of good quality enabling correct recovery of the original symbols at the receiver side.

The orthogonality defect of the channel state matrix, denoted by $\delta(H)$, measures the orthogonality of the column vectors of the channel state matrix and is expressed as $$\delta(H) = \frac{\prod_{i=1}^{n} \|h_i\|}{\sqrt{\det(H^t H)}},$$

with $h_i$ designating the $i^{th}$ column vector of the channel state matrix H. The core dependent loss value measures the misalignment losses and crosstalk effects affecting the multi-core fiber-based optical transmission channel. The misalignment losses rise due to the imperfections of the optical fiber at the splices and connector part. Three types of misalignment losses exist comprising the longitudinal displacement losses, the transverse displacement losses, and angular displacement losses. The crosstalk effects rise due to the existence of multiple cores in one cladding which generates a crosstalk between the neighboring cores.

According to some embodiments, the decoding algorithm D may be chosen in a group comprising a Zero Forcing decoding algorithm, a Zero Forcing-Decision Feedback (ZF-DFE) decoding algorithm, a Minimum Mean Square Error (MMSE) decoding algorithm, and a parameterized spherical-bound stack decoder (SB-stack).

The ZF decoding algorithm is a linear decoding algorithm that enables the decoding of the information streams independently through inter-symbol interference elimination made by a projection of the received signal Y with a ZF preprocessing matrix denoted by $B_{ZF}$ and given by:

$$B_{ZF} = (H^c H)^{-1} H^c \quad (5)$$

In equation (5), He designates the transpose conjugate matrix of the channel state matrix H. ZF decoding algorithm enables removing the crosstalk in all the channels corresponding to the different cores of the multi-core fiber. The ZF decoding algorithm requires a constant computational complexity corresponding to the channel inversion operation and given, for full rate space-time codes, by $$\mathcal{O}\left(\frac{N^3 + N^2 - N}{N}\right)$$

with $N=T \times N_c$.

The MMSE decoding algorithm is a linear decoding algorithm based also on the projection of the received signal with a MMSE preprocessing matrix denoted by $B_{ZF}$ and given by:

$$B_{MMSE} = H^c\left(HH^c + \frac{1}{\rho}I\right)^{-1} \quad (6)$$

In equation (6), p designates the signal-to-noise ratio value evaluated in decibels.

The ZF-DFE decoding algorithm is a non-linear decoding scheme that uses a recursive estimation of the information symbols based on the QR decomposition of the channel matrix H. Accordingly, the symbol estimation unit 1515 may be configured to perform QR decomposition of the channel matrix H such that H=QR with Q being an unitary matrix and R an upper triangular matrix. Given the QR decomposition of the channel matrix, the received signal Y may be equivalently given by the auxiliary signal $\tilde{Y}$ given by $\tilde{Y}=Rs+Q^t Y$. The upper triangular structure of the auxiliary signal is then exploited to determine estimates of the information symbols starting by the symbol $s_\kappa$ given by $$\hat{s}_\kappa = \left\lfloor \frac{Y_K}{R_{KK}} \right\rfloor$$

and recursively estimating symbols $s_i$ for $i=\kappa-1, \ldots, 1$ such that $$\hat{s}_i = \left\lfloor \frac{1}{R_{ii}}\left(\tilde{Y}_i - \sum_{j=i+1}^{K} R_{ij}\hat{s}_j\right)\right\rfloor,$$

with $\lfloor \cdot \rfloor$ designating the floor operator. It should be noted that expressions of the information symbols given in relation with the ZF, MMSE, and ZF-DFE decoding algorithms correspond to integer values.

According to some embodiments, the decoding algorithm D may comprise a preprocessing stage consisting in applying a lattice reduction algorithm and/or a Minimum Mean Square Error-Generalized Decision Feedback equalizer filtering. An example of a lattice-reduction algorithm is the LLL reduction disclosed in "A. K. Lenstra, H. W. Lenstra, and L. Lovasz, Factoring Polynomials with Rational Coefficients, Mathematic Annals, Volume 261, pages 515-534, 1982".

According to some embodiments, the decoder 151 may further comprise a storage unit 1513 configured to store a look-up table comprising a set of values of quality of service metrics, a set of intervals of values of channel quality indicators, a set of scrambling functions, and a set of decoding algorithms. In the look-up table, each scrambling function denoted by $\pi_F$ for $F=1, \ldots, F_{tot}$ with $F_{tot} \geq 2$ designating the total number of different scrambling functions stored in the look-up table, may be associated with one or more intervals of values of channel quality indicators designated by $Int_{1,F}, Int_{2,F}, \ldots, Int_{1_F,F}$ with $I_F$ designating the total number of intervals of values of channel quality indicators associated with the scrambling function $\pi_F$. Each interval of values of channel quality indicators $Int_{i,F}$ for $i=1, \ldots, I_F$ and $F=1, \ldots, F_{tot}$ may be associated with one or more decoding algorithms denoted by $D_{d,i,F}$ for $d=1, \ldots, d_{tot,i,F}$ with $d_{tot,i,F}$ designating the total number of decoding algorithms that may be applied when the scrambling function $\pi_F$ is applied in the scrambling devices 133 and when a channel quality indicator takes a value in the interval $Int_{i,F}$ of values of channel quality indicators. Each decoding algorithm $D_{d,i,F}$ may be associated with a value of quality of service metric denoted by $(QoS)_{d,i,F}$ that may be achieved when the decoding algorithm $D_{d,i,F}$ is applied at the symbol estimation unit 1515 to decode the optical signals scrambled during transmission over the optical fiber transmission channel according to the scrambling function $\pi_F$ and when the quality of the channel is evaluated by a channel quality indicator CQI that takes a value in the interval $Int_{i,F}$.

In such embodiments, the processing unit 1511 may be configured to determine, for the predefined scrambling function it, the decoding algorithm D by selecting, among the set of decoding algorithms $D_{d,i,F}$ stored in said look-up table for $d=1, \ldots, d_{tot,i,F}, i=1, \ldots, I_F$, and $F=^1, \ldots, F_{tot}$, a decoding algorithm $D_{d,i,F}$ depending on the one or more channel quality indicators CQI with respect to the intervals $Int_{1,F}, Int_{2,F}, \ldots, Int_{1_F,F}$ of values of channel quality indicators associated with the predefined scrambling function for $\pi_F=\pi$, and depending on the target quality of service metric $(QoS)_t$ with respect to the set of values of quality of service metrics $(QoS)_{d,i,F}$ associated with the interval of values of channel quality indicators $Int_{1,F}, Int_{2,F}, \ldots, Int_{1_F,F}$ associated with the scrambling function $\pi_F=\pi$. In other words, the processing unit 1511 may select, for a scrambling function $\pi_F=\pi$ corresponding to the predefined scrambling function, and for the interval of values of channel quality indicators $Int_{i,F}$ in which the determined channel quality indicator takes value, the decoding algorithm $D_{d,i,F}$ that is associated with a quality of service metric $(QoS)_{d,i,F}$ higher than or equal to the target quality of service metric $(QoS)_t$.

In some embodiments in which two or more decoding algorithms enable achieving the target of service metric (i.e. are associated with a quality of service metric $(QoS)_{d,i,F}$ higher than or equal to the target quality of service metric $(QoS)_t$), the decoding algorithm that has the lowest decoding complexity may be selected.

According to some embodiments, the processing unit 1511 may be configured to update the predefined scrambling function π by selecting, among the set of scrambling functions $\pi_F$ for $F=1, \ldots, F_{tot}$ with $F_{tot} \geq 2$ stored in said look-up table, a scrambling function $\pi_F$ depending on the target quality of service metric with respect to the set of values of quality of service metrics stored in the look-up table and depending on the one or more channel quality indicators with respect to the set of intervals of values of channel quality indicators. For example, if a target quality of service metric $(QoS)_t$ is not achievable, for the determined one or more channel quality indicators and for the predefined scrambling function π, the processing unit 1511 may be configured to update/modify the predefined scrambling function π such that the selected scrambling function $\pi_F$ enables, for the one or more channel quality indicators, achieving the target quality of service metric $(QoS)_t$ using at least one decoding algorithm.

According to some embodiments, the decoder 151 may further comprise a quality of service metric update unit 1517 configured to measure a quality of service metric in response to a temporal condition, the storage unit 1513 being configured to update the set of values of quality of service metrics stored in the look-up table from the measured quality of service metrics. The temporal condition may correspond to perform continuous measurements at each transmission of an optical signal over the transmission channel 13, periodical measurements for example at specific time intervals, or measurements over a sliding window.

According to some embodiments, the processing unit 1511 may be further configured to update the target quality of service metric $(QoS)_t$ depending on the value of the target quality of service metric $(QoS)_t$ with respect to a measured quality of service metric denoted by $(QOS)_m$, the update of the target quality of service metric comprising:
- increasing the target quality of service metric if the target quality of service metric is lower than the measured quality of service metric (i.e. if $(QoS)_m > (QoS)_t$), and
- decreasing said target quality of service metric if the target quality of service metric is higher than the measured quality of service metric ((i.e. if $(QoS)_m < (QoS)_t$)).

The optical fiber transmission channel 13 comprises at least one scrambling device 133 configured to apply a random or a deterministic scrambling function (the predefined scrambling function or the updated scrambling function) for scrambling the cores in the multi-core fiber. In embodiments in which the optical fiber is a concatenation of K fiber slices, scrambling devices 133 may be arranged periodically in the optical fiber transmission channel 13 according to a scrambling period denoted by $K_{scr}$. Accordingly, a scrambling device 133 may be arranged in the $k^{th}$ fiber slice if k is a multiple of the scrambling period.

The scrambling function π may be represented in a two-dimensional form according to $$\pi = \begin{pmatrix} core_1 & core_2 & \ldots & core_{N_c} \\ \pi(core_1) & \pi(core_2) & \ldots & \pi(core_{N_c}) \end{pmatrix},$$

where a core $core_i$ is permuted with the core $core_j = \pi(core_i)$.

The scrambling function π may be represented in a matrix form by a permutation matrix denoted by P, the entries of the permutation matrix are given by:

$$P_{ij} = \begin{cases} 1 & \text{if } \pi(core_i) = core_j \\ 0 & \text{otherwise} \end{cases} \quad (7)$$

According to some embodiments, the predefined scrambling function π and the scrambling functions $\pi_F$ for F=1, ..., $F_{tot}$ stored in the look-up table may use random scrambling or a deterministic scrambling criterion that depends on one or more of the core parameters associated with the cores of the multi-core fiber, a core parameter associated with a core $core_n$ being chosen in a group comprising a core type $T_n$ and a core loss value $\lambda_{n,p}$.

According to some embodiments, the core scrambling may be performed depending on the core loss values for averaging the losses experienced by the different cores, advantageously enabling a reduction of the core dependent loss value.

In such embodiments, the two or more cores of the multi-core fiber may be ordered in a numbered list denoted by $\mathcal{C} = (\{core_1, \{T_1, \lambda_{1,p}\}\}, \{core_2, \{T_2, \lambda_{2,p}\}\} \ldots, \{core_{N_c}, \{T_{N_c}, \lambda_{N_c,p}\}\})$ according to a given order (increasing or decreasing) of the core loss values associated with the two or more cores such that each core $core_i$ in the numbered list $\mathcal{C}$ is associated with a core loss value $\lambda_{i,p}$ higher than or smaller than the core loss value $\lambda_{i+1,p}$ associated with the core $core_{i+1,p}$ depending on the given order considered to order the cores.

For example, for an increasing order of the core loss values, the cores $core_i$ are ordered in the list such that the core loss value $\lambda_{i,p}$ associated with the core $core_i$ is smaller than or equal to the core loss value $\lambda_{i+1,p}$ associated with the core $core_{i+1}$, that is $\lambda_{i,p} \leq \lambda_{i+1}$, p for i=1, ..., $N_c$−1.

In embodiments using a decreasing order of the core loss values, the cores $core_i$ may be ordered in the list such that the core loss value $\lambda_{i,p}$ associated with the core $core_i$ is higher than or equal to the core loss value $\lambda_{i+1,p}$ associated with the core $core_{i+1}$, that is $\lambda_{i,p} \geq \lambda_{i+1,p}$ for i=1, ..., $N_c$−1.

The deterministic scrambling criterion may be accordingly dependent on the order of the core loss values $\lambda_{n,p}$ associated with the cores core-n for n= ..., $N_c$ and corresponding to the scrambling function that is applied for permuting a core $core_i$ with a core $core_j$ in the numbered list with i taking value between 1 and $N_c$ and j=$N_c$−i+1. Accordingly, the scrambling function π enables a two-by-two permutation of the core $core_1$ with the core $core_{N_c}$, the core $core_2$ with the core $core_{N_c-1}$, etc such that the core associated with the first highest core loss value is permuted with the core associated with the first lowest core loss value, the core associated with the second highest core loss value is permuted with the core associated with the second lowest core loss value, so on.

In some embodiments in which the number $N_c \geq 2$ of cores in the multi-core fiber is an even number, the deterministic scrambling criterion and the corresponding scrambling function may correspond to permuting the two or more cores two-by-two according to the permutation of the core $core_i$ associated with the $i^{th}$ highest core loss value with the core $core_{N_c-i+1}$ associated with the $i^{th}$ lowest core loss value, with i being comprised between 1 and the half of the number of cores in the multi-core fiber, that is i=1, ..., $$\frac{N_c}{2}.$$

In other embodiments in which the number $N_c \geq 2$ of cores in the multi-core fiber is an odd number, the deterministic scrambling criterion and the corresponding scrambling function may correspond to permuting the two or more cores two-by-two according to the permutation of the core $core_i$ associated with the $i^{th}$ highest core loss value with the core $core_{N_c-i+1}$ associated with the $i^{th}$ lowest core loss value, with i being comprised between 1 and the floor part of half the number of cores in said multi-core fiber, that is i=1, ..., $$\left\lfloor \frac{N_c}{2} \right\rfloor.$$

the operator $\lfloor \cdot \rfloor$ designating the floor operation. Accordingly, the core $$core_{\lfloor \frac{N_c}{2} \rfloor +1}$$

may not be permuted. In particular, in some embodiments in which the cores are arranged in the fiber according to a 2D grid, the core $$core_{\lfloor \frac{N_c}{2} \rfloor +1}$$

may correspond to the central core.

According to some embodiments in which the multi-core fiber is heterogeneous comprising at least two cores associated with different core types, the deterministic scrambling criterion and the corresponding scrambling function may depend on the core types $T_n$ for n=1, ..., $N_c$ associated with the two or more cores and correspond to a two-by-two permutation of the two or more cores according to the permutation of at least a first core $core_n$ with a second core $core_m$ with n≠m, the first core $core_n$ and the second core $core_m$ being associated with different core types $T_n \neq T_m$.

Core type-based scrambling criterion may be applied, for example and without limitation, using a snail scrambling technique, a rotation scrambling technique, or a snake scrambling technique.

In order to apply one of the snail, rotation, and snake scrambling techniques, the cores core-i for i taking value between 1 and $N_c$ may be classified in a numbered list $\mathcal{C}$ =({$core_1$, {$T_1$, $\lambda_{1,p}$}}, {$core_3$, {$T_2$, $\lambda_{2,p}$}}, {$core_3$, {$T_3$, $\lambda_{3,p}$}}, ..., {$core_{N_c}$, {$T_{N_c}$, $\lambda_{N_c,p}$}}) such that each core $core_i$ in the numbered list C is associated with a different core type compared with the core $core_{i+1}$, for i=1, ..., $N_c$.

Using the numbering of the cores in the set $\mathcal{C}$ and according to any of the snail, rotation, or snake scrambling techniques, a scrambling function $\pi$ may correspond to the permutation of each core $core_i$ in the set $\mathcal{C}$ with i=1, ..., $N_c$–1, with the core $\pi(core_i)=core_{i+1}$ and to the permutation of the core $core_{N_c}$ with the core $\pi(core_{N_c})=core_1$.

In a first example, the snail scrambling technique corresponds to the application of the scrambling rule $\pi(core_i)= core_{i+1}$ for i=1, ..., $N_c$–1 and $\pi(core_{N_c})=core_1$ in a heterogeneous multi-core fiber comprising an odd number of cores among which a core is a central core and the remaining cores are arranged in the edges of the hexagon. In particular, depending on the ordering of the cores in the set $\mathcal{C}$, the core $core_1$ may correspond to the central core.

Figure 10:
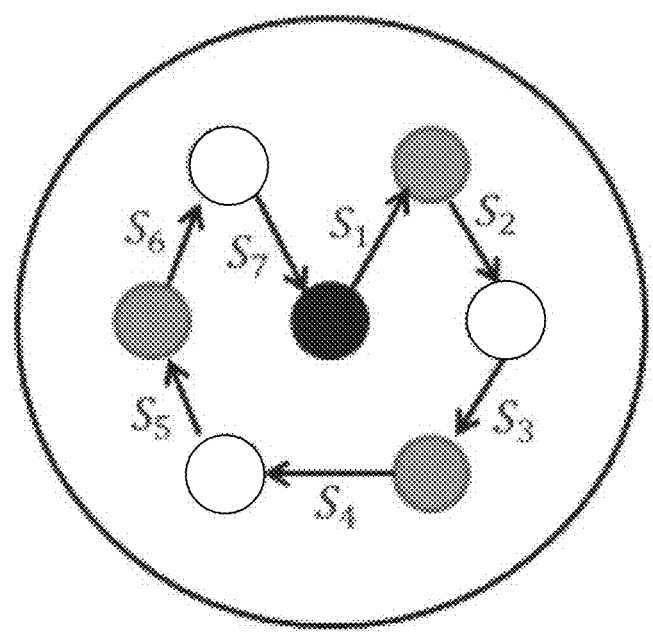
FIG. 10 is a cross section view of a multi-core fiber, according to some embodiments in which a snail scrambling technique is considered.

FIG. 10 is a cross section view of a 7-cores heterogeneous multi-core fiber in which the seven cores are scrambled using a snail scrambling technique according to the clockwise direction such that the central core is permuted with his neighbor core located on the right side and that each of the remaining cores is permuted with its left-hand neighbor core of a different type, the core located on the left side of the central core being permuted with the central core. The scrambling function may be written in this example in the two-dimensional form as $$\pi = \begin{pmatrix} core_1 & core_2 & ... & core_7 \\ (core_1) & (core_2) & ... & (core_1) \end{pmatrix}$$

such that $core_1$ corresponds to the central core and in the matrix representation according to $$P = \begin{pmatrix} 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \\ 1 & 0 & 0 & 0 & 0 & 0 & 0 \end{pmatrix}.$$

The symbols $s_1, s_2, ..., s_7$ are accordingly permuted such that after the application of the scrambling function, the symbol $s_1$ propagates through the core $core_2$, each symbol $s_i$ for i=2, ..., 6 propagates through the core $core_{i+1}$, and the symbol $s_7$ propagates through the central core.

Figure 11:
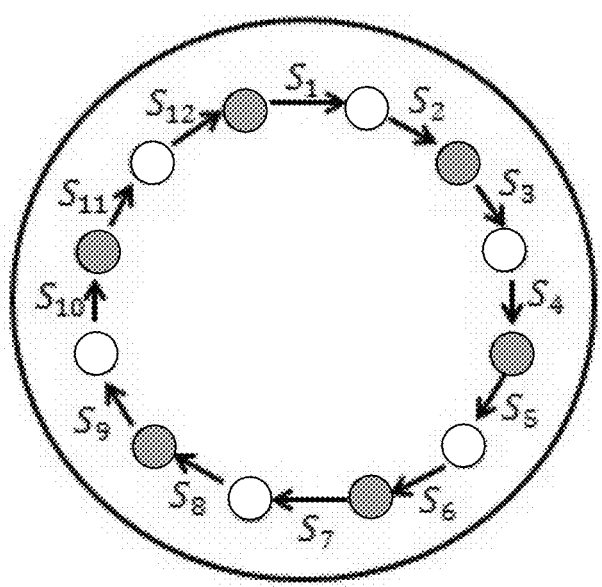
FIG. 11 is a cross section view of a multi-core fiber, according to some embodiments in which a rotation scrambling technique is considered.

FIG. 11 illustrates a cross section view of a 12-cores heterogeneous multi-core fiber in which the twelve cores are permuted using a rotation scrambling technique according to the clockwise direction. The cores are arranged in a ring form. Using the rotation scrambling technique, each core is permuted with its right-hand neighbor core of a different type such that $\pi(core_i)=core_{i+1}$ for i=1, ..., 11 and the core $core_{12}$ is permuted with the core $core_1$.

Figure 12:
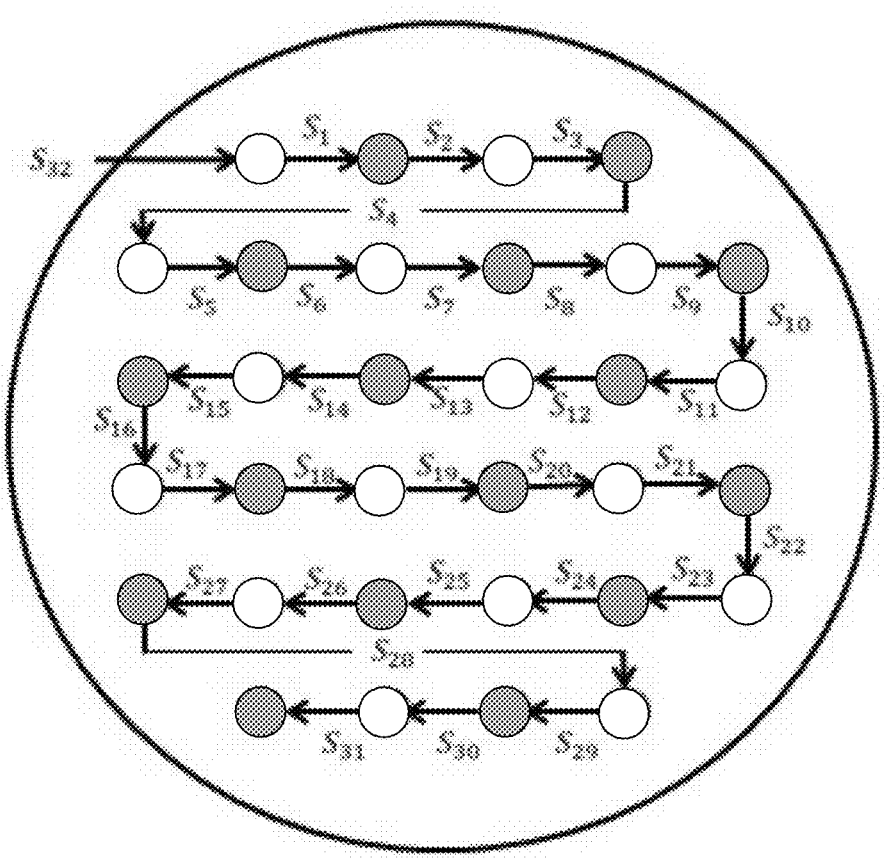
FIG. 12 is a cross section view of a multi-core fiber, according to some embodiments in which a snake scrambling technique is considered.

FIG. 12 illustrates a cross section view of a 32-cores heterogeneous multi-core fiber in which the cores are permuted using a snake scrambling technique according to the clockwise direction. The cores are arranged in a two-dimensional grid comprising six layers. The first upper layer comprises four cores numbered as $core_1$, $core_2$, $core_3$, $core_4$. The second layer located underside the first layer comprises six cores numbered as $core_5$-$core_{10}$. The third layer located underside the second layer comprises six cores numbered $core_{11}$-$core_{16}$. The fourth layer located below the third layer comprises six cores numbered $core_{17}$-$core_{22}$. The fifth layer located below the fourth layer comprises six cores numbered $core_{23}$-$core_{28}$. And finally a lower layer comprises four cores numbered $core_{29}$-$core_{32}$. According to the snake scrambling technique, each core in each layer is permuted with its right-hand neighbor core of a different type, the last core of each layer is permuted with the first core of the layer located below said each layer, and the core $core_{32}$ (i.e. the last core of the lower layer) is permuted with the core $core_1$ (i.e. with the first core of the upper layer).

FIGS. 10, 11, and 12 illustrate examples of the application of the snail, rotation, and snake scrambling techniques according to a permutation of the cores in the clockwise direction. However, it should be noted that the snail, rotation, and snake scrambling techniques may be also applied according to a permutation of the cores in the counterclockwise direction.

In some embodiments in which the multi-core fiber is an heterogeneous multi-core fiber, the deterministic scrambling criterion and the corresponding scrambling function may depend on the core types $T_n$ for n=1, ..., $N_c$ and the core loss values $\lambda_{n,p}$ for n=1, ..., $N_c$ associated with the $N_c$ cores and correspond to a two-by-two permutation of said two or more cores according to the permutation of at least a first core $core_n$ with a second core $core_m$ with n≠m, the first core $core_n$ and the second core $core_n$, being associated with different core types $T_n \neq T_m$ and different core loss values.

According to some embodiments, at least one scrambling device 133 may be configured to apply the scrambling function in the electrical field.

In other embodiments, at least one scrambling device 133 may be an optical device, configured to apply the scrambling function in the optical field. Exemplary optical scrambling devices comprise converters, optical multiplexers, optical multiplexing devices, and photonic lanterns.

The following description of certain embodiments of the invention will be made with reference to an optical communication system 100 using a single polarization, a single wavelength, a single carrier-modulation, a single error correcting code with Space-Time Coding, and a single-mode multi-core fiber, for illustration purposes only. However, the skilled person will readily understand that the various embodiments of the invention can also be applied in multi-core fibers in combination with polarization multiplexing using two polarizations and/or in combination with wavelength multiplexing using a plurality of wavelengths, and/or in combination with mode multiplexing using multi-mode fiber cores, and/or in combination with multi-carrier modulation formats.

In embodiments in which the optical fiber transmission channel 13 experiences inter-core crosstalk effects and misalignment effects, the optical transmission channel 13 may be represented by an optical multiple-input multiple-output (MIMO) system described by the relation:

$$Y = H \cdot X + N \quad (8)$$

In equation (8):

X designates a complex-value vector of length $N_c$ comprising $N_c$ symbols transmitted over the optical transmission channel 13 such that the $n^{th}$ symbol is transmitted over the core-n with $n = 1, \ldots, N_c$;

Y is a complex-value vector of length $N_c$ designating the received signal at the optical receiver 15, H is a complex-value matrix of dimensions $N_c \times N_c$ designating the optical channel matrix and representing the undergone attenuations and the losses experienced by the cores during the optical signal propagation over the different cores in the multi-core fiber in addition to the misalignment losses, and N is a real-value vector of length $N_c$ designating the optical channel noise.

According to some embodiments, the optical channel noise may be a White Gaussian Noise of zero-mean and variance $N_0$.

In some embodiments, the misalignment losses may rise due to the imperfections of the optical fiber at the fiber spans and of the connectors (e.g. the connectors between the FAN-IN/FAN-OUT devices and the input/output ends of the optical fiber transmission channel). Misalignments may comprise a misalignment chosen in a group comprising a longitudinal misalignment, a transverse misalignment, and an angular misalignment.

According to some embodiments, the misalignment losses may be modeled as random Gaussian variables. More specifically, the misalignment loss associated with core-n may be modeled as a random Gaussian variable of zero-mean and a standard deviation denoted by $\sigma_{(x,y),n}$ expressed according to:

$$\sigma_{(x,y),n} = \frac{r_d}{R_n} \quad (9)$$

In equation (9), $r_d$ designates the transverse displacement of the multi-core fiber in the 'x' and 'y' directions.

In embodiments in which a scrambling devices is arranged in each $k^{th}$ fiber slice for k a multiple of the scrambling period, each fiber span is equivalent to a multiplication of a crosstalk channel matrix, a misalignment channel matrix, and a permutation matrix $P^{(k)} = P$ which is a $N_c \times N_c$ matrix representing the application of the scrambling function $\pi$ in the $k^{th}$ fiber span by the $k^{th}$ scrambling device 133. In such embodiments, the optical MIMO system of equation (8) can be equivalently expressed according to:

$$Y = L \Pi_{k=1}^{K} ((H_{XT,k}) M_k P^{(k)}) X + N \quad (10)$$

In equation (10):

L designates a normalization factor used to compensate the optical fiber link loss;

$H_{XT,k}$ designates the crosstalk channel matrix associated with the $k^{th}$ fiber span, and $M_k$ designates the misalignment channel matrix associated with the $k^{th}$ fiber span.

The inter-core crosstalk effects may be represented by a cross-talk channel matrix denoted by $H_{XT}$ expressed according to:

$$H_{XT} = \begin{bmatrix} XT_1 & XT_{1,2} & \ldots & XT_{1,N_c} \\ XT_{2,1} & \ddots & \ldots & XT_{2,N_c} \\ \vdots & \vdots & \ddots & \vdots \\ XT_{N_c,1} & XT_{N_c,2} & \ldots & XT_{N_c,N_c} \end{bmatrix} \quad (11)$$

In equation (11), the diagonal entries of the crosstalk channel matrix are given by $XT_n = 1 - \Sigma_{n \neq m} XT_{n,m}$. The crosstalk represents the exchanging energy between the cores and can be estimated based on the coupled-power theory, known to the person skilled in the art.

According to some embodiments in which the multi-core fiber is homogeneous, the crosstalk coefficients $XT_{n,m}$ quantifying the crosstalk between each core-n and core-m with $n \neq m$ are expressed according to:

$$XT_{n,m} = \frac{2k_{n,m}^2 R_b}{\Lambda \beta^2} L \quad (12)$$

In equation (12), $\Lambda$ designates the core-to-core distance and $\beta^2$ designates the propagation constant.

According to some embodiments in which the multi-core fiber is heterogeneous, the crosstalk coefficients $XT_{n,m}$ quantifying the crosstalk between each core-n and core-m with $n \neq m$ are expressed according to:

$$XT_{n,m} = \frac{2k_{n,m}^2}{\Delta \beta_{n,m}^2 d} L \quad (13)$$

The channel matrix can be decomposed the singular value decomposition according to:

$$H = U \cdot \begin{bmatrix} \alpha_{1,p} XT_1 & \ldots & 0 \\ \vdots & \ddots & \vdots \\ 0 & \ldots & \alpha_{N_c,p} XT_{N_c} \end{bmatrix} \cdot V \quad (14)$$

The processing unit 1511 may be configured to determine the core dependent loss value as the channel quality indicator by determining a core loss value in association with each core of the multi-core fiber using the channel matrix expression given in equation (14).

Using the fiber decomposition into fiber spans, the misalignment losses coefficients $\alpha_{i,p}$ may be given by:

$$\alpha_{i,p} = \Pi_{k=1}^{K} \alpha_{i,p}^{k} = c \cdot \exp(Z_{i,p}) = \Sigma_{k=1}^{K} -b(dx_{k,i}^2 + dy_{k,i}^2) \quad (15)$$

In equation (15), c designates a constant multiplication factor, $dx_{k,i}^2$ and $dy_{k,i}^2$ for i=1, ..., $N_c$ designate Chi-squared distributed random variables with one degree of freedom, a mean value equal to $(\sigma_{(x,y),i})^2$, and a variance equal to $2(\sigma_{(x,y),i})^4$.

Given the types $T_n$ of the cores of the multi-core fiber and using the concatenation of the K slices in the multi-core fiber, the variable $Z_{i,p}$ can be expressed according to:

$$Z_{i,p} = (-b_1) \sum_{k=1}^{K_1} \frac{(dx_{k,i}^2 + dy_{k,i}^2)}{X_1} + \ldots + (-b_T) \sum_{k=1}^{K_T} \frac{(dx_{k,i}^2 + dy_{k,i}^2)}{X_T} \quad (16)$$

In equation (16):
T designates the total number of different types of cores associated with the cores of the multi-core fiber,
$K_j$ for j=1, ..., T designates the number of cores of the $j^{th}$ core type among the total number of different types of cores associated with the cores of the multi-core fiber, and
$X_j$ for j=1, ..., T designates a normal distributed variable with mean $\mu_{X_j}$ and variance $\sigma_{X_j}^2$ expressed respectively according to:

$$\mu_{X_j} = -2K_j b_j (\sigma_{(x,y),i})^2 \quad (17)$$

$$\sigma_{X_j}^2 = 4K_j b_j^2 (\sigma_{(x,y),i})^4 \quad (18)$$

Considering embodiments in which the number of fiber spans K is high, the inventors showed that each variable $Z_{i,p}$ can be modeled as a normally distributed variable with mean $\mu_{Z_i} = \Sigma_{j=1}^{T} \mu_{X_j}$ and a variance $\sigma_{Z_i}^2 = \Sigma_{j=1}^{T} \sigma_{X_j}^2$. Accordingly, the total losses coefficients $\alpha_{i,p}$ can be modeled by a lognormal random variable with a mean value $\mu_{\alpha_i}$ and a variance value $\sigma_{\alpha_i}^2$ given respectively by:

$$\mu_{\alpha_{i,p}} = \exp(\mu_{Z_i} + \sigma_{Z_i}^2/2) \quad (19)$$

$$\sigma_{\alpha_{i,p}}^2 = (\exp(\sigma_{Z_i}^2) - 1) \cdot \mu_{\alpha_{i,p}}^2 \quad (20)$$

According to the derivation of the singular value decomposition of the optical channel matrix, the optical MIMO system of equation (10) can be expressed according to:

$$Y = \sqrt{L} \cdot U \cdot \begin{bmatrix} \alpha_{1,p} XT_1 & \cdots & 0 \\ \vdots & \ddots & \vdots \\ 0 & \cdots & \alpha_{N_c,p} XT_{N_c} \end{bmatrix} V \cdot X + N = \quad (21)$$

$$\sqrt{L} \cdot U \cdot \begin{bmatrix} \lambda_{1,p} & \cdots & 0 \\ \vdots & \ddots & \vdots \\ 0 & \cdots & \lambda_{N_c,p} \end{bmatrix} V \cdot X + N$$

According to equation (21), the processing unit 1511 be configured to determine the core loss value $\lambda_{n,p}$ associated with each core core-n, for n=1, and resulting of the application of the scrambling function π, such that the core loss value $\lambda_{n,p}$ is a lognormally distributed variable with mean $\mu_{\lambda_{n,p}} = \mu_{\alpha_{n,p}} XT_n$ and variance $\sigma_{\lambda_{n,p}}^2 = \sigma_{\alpha_{n,p}}^2 XT_n^2$, the mean and the variance of each core loss value being dependent on the fiber parameters involving the total crosstalk coefficient $XT_n$ associated with said each core, on the misalignment losses and the scrambling function π rising in the mean and the variance of the lognormal distribution of the total losses coefficients $\alpha_{i,p}$. More specifically, the mean value $\mu_{\lambda_{n,p}}$ of each core loss value $\lambda_{n,p}$ associated with each core core-n of the multi-core fiber is a product between a first value and a second value, the first value $\mu_{\alpha_n}$ corresponding to the mean of the lognormal random variable $\alpha_n$ representing the total misalignment loss associated with the core core-n, the second value $XT_n$ corresponding to the total crosstalk coefficient associated with said core core-n. The variance value $\sigma_{\lambda_{n,p}}^2$ of each core loss value $\lambda_{n,p}$ associated with each core core-n of the multi-core fiber is the product between the square value $XT_n^2$ of the total crosstalk coefficient $XT_n$ associated with the core core-n and a third value corresponding to the variance $\sigma_{\alpha_n}^2$ of the lognormal random variable $\alpha_n$ representing the total misalignment loss associated with the core core-n.

In some embodiments in which the multi-core fiber is heterogeneous, the processing unit 1511 may be configured to determine the core dependent loss value denoted by $CDL_{heter}$ as a ratio between a first core loss value denoted by $\lambda_{max,p}$ and a second core loss value denoted by $\lambda_{min,p}$, the first value being given by the highest core loss value among the core loss values associated with each of the cores of the multi-core fiber, and the second value being given by the smallest core loss value among the core loss values associated with each of the cores of the multi-core fiber. The core dependent loss $CDL_{heter}$ can be expressed in the logarithmic scale according to:

$$CDL_{heter,dB} = 10 \log_{10}\left(\frac{\lambda_{max,p}}{\lambda_{min,p}}\right) \quad (22)$$

Given the determined core loss values $\lambda_{n,p}$ in association with each of the cores of the multi-core fiber, the processing unit 1511 may be configured to determine the core dependent loss value in the logarithmic scale according to a Gaussian distribution of mean denoted by $\mu_{CDL}$ and variance $\sigma^2_{CDL}$ given respectively by:

$$\mu_{CDL_{heter}} = \frac{20}{\log(10)} \log\left(\frac{XT_{imax}}{XT_{imin}}\right) + \mu_{Z_{imax}} - \mu_{Z_{imin}} \quad (23)$$

$$\sigma^2_{CDL_{heter}} = \frac{20}{\log(10)} \left(\log\left(\frac{XT_{imax}}{XT_{imin}}\right)\right) \cdot (\sigma^2_{Z_{imax}} + \sigma^2_{Z_{imin}}) \quad (24)$$

In equations (23) and (24), imax and imin designate respectively the numbering indices of the cores core-imax and core-imin associated respectively with the first core loss value $\lambda_{max,p}$ and the second core loss value $\lambda_{min,p}$.

According to other embodiments in which the multi-core fiber is homogeneous, the processing unit 1511 may be configured to perform an estimation of the core dependent loss value denoted by $CDL_{hom}$ based on the setting a confidence interval rather than using the theoretical estimation given by equation (22). Indeed, the core loss values $\lambda_{n,p}$ of homogeneous multi-core fibers have the same lognormal distribution with mean $\mu_{\lambda_{n,p}} = \mu_{\alpha_{n,total}} XT_n$ and variance $\sigma_{\lambda_{n,p}}^2 = \sigma_{\alpha_{n,total}}^2 XT_n^2$ with $\alpha_{n,total}$ designating the total misalignment loss at the end of the optical fiber link which is lognormal distributed with a mean $\mu_{\alpha_{n,total}}$ and a variance $\sigma_{\alpha_{n,total}}^2$ given respectively according to:

$$\mu_{a_{n,total}} = \exp(\mu_Z + \sigma_Z^2/2) = \exp(2Kb_n(b_n\sigma_{(x,y),n}^4 - \sigma_{(x,y),n}^2)) \quad (25)$$

$$\sigma_{a_{n,total}}^2 = (\exp(\sigma_Z^2) - 1) \cdot \mu_{a_n}^2 = (\exp(4Kb_n^2\sigma_{(x,y),n}^4) - 1) x \mu_{a_n}^2 \quad (26)$$

In equations (25) and (26), Z is a variable with a normal distribution with mean $\mu_Z = 2Kb(\sigma_{(x,y)})^2$ and variance $\sigma_Z^2 = 4Kb^2\sigma_{(x,y)}^4$.

A confidence interval consists of a range of values that act as good estimates of a random parameter. The desired/target level of confidence is predefined. The most commonly used confidence levels are 68%, 90%, 95%, and 99%. The critical value γ of the confidence intervals C for Gaussian distributions can be obtained using the inverse of the cumulative distribution function Φ according to:

$$\gamma = \phi^{-1} = \frac{\theta}{2} \quad (27)$$

In equation (27), θ is equal to $$\frac{(1-C)}{2}.$$

For homogeneous multi-core fibers, the core dependent loss value may be determined as the ratio between the upper limit and the lower limit of the confidence interval of the lognormal distribution corresponding to a predefined confidence level. The processing unit 1511 may be configured to determine at a first step the upper and lower limits for the Gaussian distribution Z. At a second step, the processing unit 1511 may be configured to convert the determined upper and lower limits by using the exponential function.

In some embodiments in which the confidence level is set to 90%, the upper and lower limits of the confidence interval respectively denoted by $I_{max,p}$ and $I_{min,p}$ are determined by the inventors according to:

$$I_{max,p} = XT_{max}\exp(\mathcal{N}(\mu_Z + 1.645\sigma_Z)) \quad (28)$$

$$I_{max,p} = XT_{min}\exp(\mathcal{N}(\mu_Z - 1.645\sigma_Z)) \quad (29)$$

The core dependent loss value in the logarithmic domain is determined accordingly as:

$$CDL_{hom,dB} = \quad (30)$$

$$10\log_{10}\left(\frac{I_{max,p}}{I_{min,p}}\right) = \mathcal{N}\left((8.68)x\left(\ln\left(\frac{XT_{max}}{XT_{min}}\right) + (3.29\sigma_Z)\right), (8.68^2 x 2\sigma_Z^2)\right)$$

The embodiments of the invention enable the use of a linear or a non-linear decoding algorithm that offers near-optimal ML decoding performance while requiring a low-complexity compared with the computational complexity involved using the ML decoder. More specifically, the use of a linear or a non-linear decoding algorithm in the presence of core scrambling based on deterministic core scrambling criterion enables a removal of the CDL effects impacting the transmission channel.

The efficiency of the decoding techniques provided in the various embodiments of the invention has been evaluated for a 7-core heterogeneous multi-core fiber for which a snail scrambling technique is applied and for a 12-core heterogeneous multi-core fiber for which a rotation (also referred to as 'circular') scrambling technique is applied. Uncoded 16-QAM modulation is used at the transmitter and ZF or ML decoding is used at the receiver.

Figure 13:
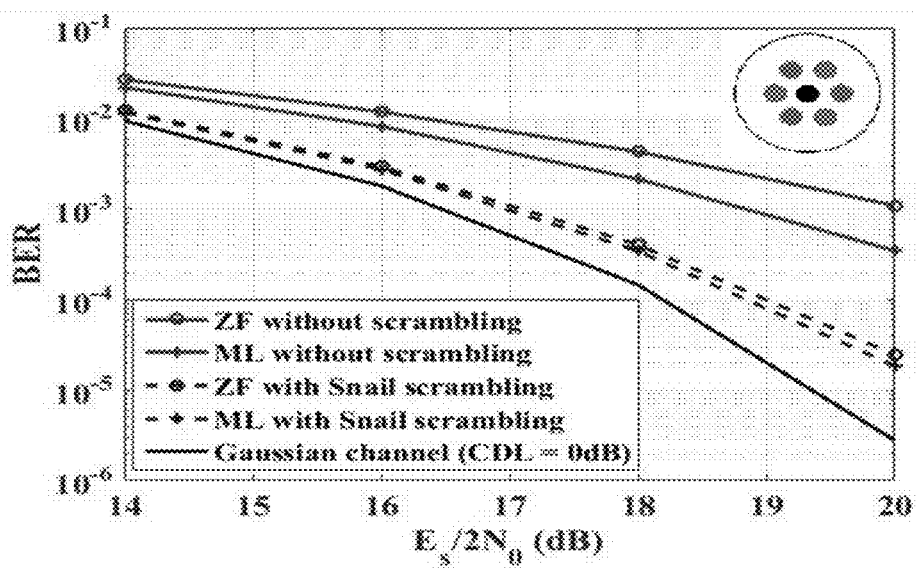
FIG. 13 shows diagrams representing the bit error rate (BER) performance as a function of the signal-to-noise ratio obtained in some embodiments in which a snail scrambling technique and Zero Forcing decoding are used in a 7-core heterogeneous fiber-based transmission system.

FIG. 13 shows diagrams evaluating the bit error rate (BER) performance as a function of the signal-to-noise ratio obtained for different embodiments using a 7-core heterogeneous fiber and ML decoding or ZF decoding at the receiver. The bit error rate performance obtained using ZF decoding and snail scrambling is compared to the performance obtained using optimal ML decoding. Diagrams of FIG. 13 show that in embodiments in which no scrambling is applied to the cores of the multi-core fiber, ZF decoding performs worse than optimal ML decoding with a 3.5 dB signal-to-noise ratio penalty at BER=$10^{-3}$. However, applying the snail scrambling technique with $K_{src}$=50 enables reducing the CDL effect and allows ZF decoding to have almost the same performance as optimal ML decoding with a signal-to-noise ratio penalty of only 0.4 dB at BER=$10^{-3}$.

Figure 14:
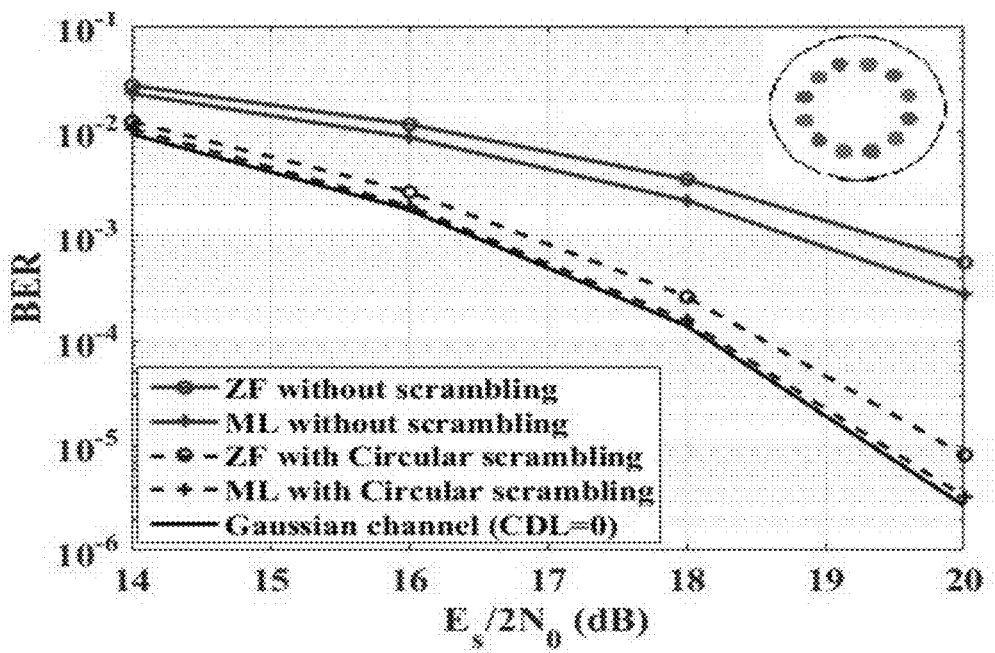
FIG. 14 shows diagrams representing the bit error rate (BER) performance as a function of the signal-to-noise ratio obtained in some embodiments in which a snail scrambling technique and Zero Forcing decoding are used in a 12-core heterogeneous fiber-based transmission system.

FIG. 14 shows diagrams evaluating the BER performance as a function of the signal-to-noise ratio obtained for different embodiments using a 12-core heterogeneous fiber and ML decoding or ZF decoding at the receiver. The results of FIG. 14 confirm the results obtained in FIG. 13 and show that the application of circular core scrambling in the presence of ZF decoding offers near-ML performance. Applying circular scrambling using $K_{src}$=150 enables reducing the SNR penalty between the ZF decoding algorithm and ML decoding algorithm to only 0.2 dB at BER=$10^{-3}$.

Figure 15:
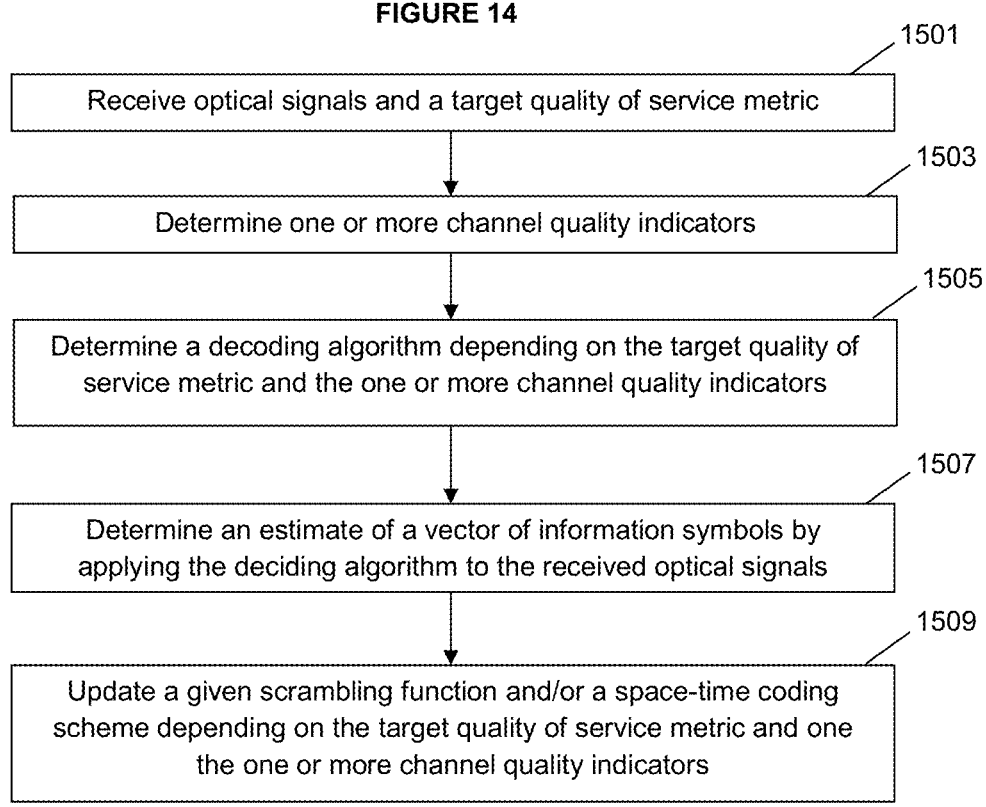
FIG. 15 is a flowchart depicting a method for adaptive decoding and scrambling of optical signals transmitted over a multi-core fiber transmission channel, according to some embodiments.

Referring to FIG. 15, there is also provided a decoding method for determining an estimate of a vector of information symbols carried by optical signals propagating along two or more cores of a multi-core fiber in an optical fiber transmission channel, the optical signals being scrambled according to a predefined scrambling function π.

At step 1501, optical signals representing the output of the optical fiber transmission channel and a target quality of service metric $(QoS)_t$ may be received.

At step 1503, one or more channel quality indicators CQI may be determined from the received optical signals in response to a temporal condition.

At step 1505, a decoding algorithm D may be determined depending on the target quality of service metric $(QoS)_t$ and on the determined one or more channel quality indicators CQI.

At step 1507, an estimate of a vector of information symbols may be determined by applying the decoding algorithm D to the received optical signals.

At step 1509, an update on the predefined scrambling function and/or the space-time coding scheme may be performed depending on the target quality of service metric and the determined one or more channel quality indicators.

Although some embodiments have been described in connection to multi-core multi-mode fibers in which a single polarization, a single wavelength and single-carrier modulation, are used, it should be noted that the invention can also be applied in multi-core multi-mode fibers in combination with polarization multiplexing using two polarizations and/or in combination with the use of wavelength multiplexing using several wavelengths, and/or using multi-carrier modulation formats.

Further, the invention is not limited to communication applications and may be integrated in other applications such as data storage and medical imaging. The invention may be used in several optical transmission systems, for example automotive industry applications, in oil or gas markets, in aerospace and avionics sectors, sensing applications, etc.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A decoder for determining an estimate of a vector of information symbols carried by optical signals propagating along a multi-core fiber in an optical fiber transmission channel according to two or more cores, said decoder being implemented in an optical receiver, said optical signals being encoded using a space-time coding scheme and/or being scrambled by at least one scrambling device arranged in said optical fiber transmission channel according to a predefined scrambling function, wherein the decoder comprises a processing unit configured to adaptively:
   determine, in response to a temporal condition, one or more channel quality indicators from said optical signals;
   determine a decoding algorithm according to a target quality of service metric and on said one or more channel quality indicators;
   update said predefined scrambling function and/or said space-time coding scheme depending on said target quality of service metric and on said one or more channel quality indicators,
   the decoder further comprising a symbol estimation unit configured to determine an estimate of a vector of information symbols by applying said decoding algorithm to said optical signals.

2. The decoder of claim 1, wherein said target quality of service metric is chosen in a group comprising a target symbol error rate and a target transmission rate.

3. The decoder of claim 1, wherein said channel quality indicator is chosen in a group comprising a signal-to-noise ratio, a conditioning number of a channel state matrix representing said optical fiber transmission channel, a channel outage probability, the orthogonality defect factor of said channel state matrix, and a core dependent loss value.

4. The decoder of claim 1, wherein said decoding algorithm is chosen in a group comprising a Zero Forcing decoding algorithm, a Zero Forcing-Decision Feedback decoding algorithm, a Minimum Mean Square Error decoding algorithm, and a parameterized spherical-bound stack decoder.

5. The decoder of claim 4, wherein said decoding algorithm comprises a preprocessing stage consisting in applying a lattice reduction algorithm and/or a Minimum Mean Square Error-Generalized Decision Feedback equalizer filtering.

6. The decoder of claim 1, wherein the decoder comprises a storage unit configured to store a look-up table comprising a set of values of quality of service metrics, a set of intervals of values of channel quality indicators, a set of random and deterministic scrambling functions, and a set of decoding algorithms, each scrambling function being associated with one or more intervals of values of channel quality indicators, each interval of values of channel quality indicators being associated with one or more decoding algorithms, each of said one or more decoding algorithms being associated with a value of quality of service metric, said processing unit being configured to determine said decoding algorithm, for said predefined scrambling function, by selecting, among the set of decoding algorithms associated with an interval of values of channel quality indicators wherein said one or more channel quality indicator takes value, the decoding algorithm that is associated with a value of quality of service metric that is higher than or equal to said target quality of service metric.

7. The decoder of claim 6, wherein the processing unit is configured to update said predefined scrambling function by selecting, among the set of scrambling functions stored in said look-up table, a scrambling function depending on said target quality of service metric with respect to said set of values of quality of service metrics and depending on said one or more channel quality indicators with respect to said set of intervals of values of channel quality indicators.

8. The decoder of claim 6, wherein the decoder comprises a quality of service metric update unit configured to measure a quality of service metric in response to a temporal condition, the storage unit being configured to update the set of values of quality of service metrics stored in said look-up table from the measured quality of service metrics.

9. The decoder of claim 8, wherein a processing unit is configured to update a target quality of service metric depending on the value of said target quality of service metric with respect to a measured quality of service metric, said update of the target quality of service metric comprising:
   increasing said target quality of service metric if the target quality of service metric is lower than said measured quality of service metric, and
   decreasing said target quality of service metric if the target quality of service metric is higher than said measured quality of service metric.

10. The decoder of claim 1, wherein each core comprised in said multi-core fiber is associated with one or more parameters chosen in a group comprising a core type and a core loss value, a scrambling function being applied to permute said two or more cores depending on one or more of the core parameters associated with said two or more cores.

11. The decoder of claim 10, wherein said two or more cores are ordered according to a given order of the core loss values associated with said two or more cores, said scrambling function corresponding to a two-by-two permutation of said two or more cores depending on the order of the core loss values associated with said two or more cores.

12. The decoder of claim 10, wherein the multi-core fiber is heterogeneous and comprises at least two cores associated with different core types, said scrambling function corresponding to a two-by-two permutation of said two or more cores according to the permutation of at least a first core with a second core, the first core and the second core being associated with different core types.

13. A decoding method for determining an estimate of a vector of information symbols carried by optical signals propagating along a multi-core fiber in an optical fiber transmission channel according to two or more cores, said optical signals being encoded using a space-time coding scheme and/or being scrambled by at least one scrambling device arranged in said optical fiber transmission channel according to a predefined scrambling function, wherein the decoding method comprises adaptively:
   determining, in response to a temporal condition, one or more channel quality indicators from said optical signals;
   determining a decoding algorithm according to a target quality of service metric and depending on said one or more channel quality indicators;

updating said predefined scrambling function and/or said space-time coding scheme depending on said target quality of service metric and on said one or more channel quality indicators, the decoding method further comprising determining said estimate of a vector of information symbols by applying said decoding algorithm to said optical signals.

\* \* \* \* \*